US012671482B2

(12) United States Patent
Yoon et al.

(10) Patent No.: US 12,671,482 B2
(45) Date of Patent: Jun. 30, 2026

(54) APPARATUS FOR ANTENNA SWITCHING IN WIRELESS COMMUNICATION SYSTEM AND OPERATING METHOD THEREOF

(71) Applicant: SAMSUNG ELECTRONICS CO., LTD., Suwon-si (KR)

(72) Inventors: Hongsik Yoon, Suwon si (KR); Jungmin Park, Suwon si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 646 days.

(21) Appl. No.: 18/180,424

(22) Filed: Mar. 8, 2023

(65) Prior Publication Data

US 2023/0353218 A1       Nov. 2, 2023

(30) Foreign Application Priority Data

Mar. 10, 2022    (KR) ........................ 10 2022 0030330
Aug. 1, 2022    (KR) ........................ 10 2022 0095688

(51) Int. Cl.
   *H04B 7/06*       (2006.01)
   *H04L 5/00*       (2006.01)
(52) U.S. Cl.
   CPC ......... *H04B 7/0686* (2013.01); *H04B 7/0626* (2013.01); *H04L 5/001* (2013.01)
(58) Field of Classification Search
   CPC .. H04B 7/0686; H04B 7/0626; H04B 7/0691; H04B 7/0602; H04L 5/001;
   (Continued)

(56) References Cited

U.S. PATENT DOCUMENTS 8,498,656 B2    7/2013  Mujtaba et al.
9,979,453 B2    5/2018  Wang et al.
(Continued)

FOREIGN PATENT DOCUMENTS

JP       6843700       3/2021
WO    2006020411       2/2006
WO    2011046498       4/2011
WO    2022020830       1/2022

OTHER PUBLICATIONS

1st Office Action—Communication pursuant to Article 94(3) EPC issued Jun. 13, 2025 in corresponding European Patent Application No. 23160234.3.

(Continued)

*Primary Examiner* — Tejis Daya
(74) *Attorney, Agent, or Firm* — Morgan, Lewis & Bockius LLP

(57)                 ABSTRACT

Provided is a user equipment including a plurality of antennas including at least first and second groups of antennas, each group respectively allocated to one of a plurality of component carriers according to layer allocation information of the plurality of component carriers, a radio frequency integrated circuit (RFIC) configured to transmit or receive a signal at frequencies of the plurality of component carriers through the plurality of antennas, and a processor configured to measure respective channel states of the plurality of component carriers, generate a request to change the layer allocation information of the plurality of component carriers, based on the channel states, and control the RFIC to transmit the request to change, to the base station.

18 Claims, 17 Drawing Sheets

(58) Field of Classification Search
CPC ... H04L 5/0023; H04L 5/0053; H04L 5/0057; H04L 5/0096
See application file for complete search history.

(56) References Cited

U.S. PATENT DOCUMENTS

| | | | |
|---|---|---|---|
| 11,202,283 B2 | 12/2021 | Takahashi et al. | |
| 2011/0268071 A1 | 11/2011 | Siew et al. | |
| 2014/0192845 A1* | 7/2014 | Szini | H04B 7/061 |
| | | | 375/267 |
| 2015/0304076 A1* | 10/2015 | Lee | H04L 23/00 |
| | | | 370/329 |
| 2016/0211903 A1* | 7/2016 | Damnjanovic | H04W 24/10 |
| 2021/0105108 A1 | 4/2021 | Abdelghaffar et al. | |
| 2021/0136598 A1* | 5/2021 | Raghavan | H04B 7/0874 |
| 2021/0266076 A1 | 8/2021 | Chen et al. | |
| 2021/0352580 A1 | 11/2021 | Zhou et al. | |
| 2021/0377876 A1* | 12/2021 | Jeon | H04W 52/365 |
| 2025/0030475 A1* | 1/2025 | Li | H04W 76/15 |

OTHER PUBLICATIONS

Technical Specification, "5G; NR; Radio Resource Control (RRC)"; Protocol specification, (3GPP TS 38.331 version 16.7.0 Release 16), ETSI TS 138 331 V16.7.0 (Jan. 2022), 950 pages.

Technical Specification, "5G; NR; Medium Access Control (MAC) protocol specification", (3GPP TS 38.321 version 16.7.0 Release 16), ETSI TS 138 321 V16.7.0 (Jan. 2022), 160 pages.

Technical Specification, "5G; NR; Multiplexing and channel coding" (3GPP TS 38.212 version 16.8.0 Release 16), ETSI TS 138 212 V16.8.0 (Jan. 2022), 157 pages.

Technical Specification, "5G; NR; Requirements for support of radio resource management", (3GPP TS 38.133 version 16.9.0 Release 16), ETSI TS 138 133 V16.9.0 (Dec. 2021), 2910 pages.

Extended European Search Report dated Jul. 17, 2023 in corresponding European Patent Application No. 23160234.3 (12 pages).

"5G; NR; Radio Resource Control (RRC); Protocol specification (3GPP TS 38.331 version 15.16.0 Release 15)", ETST Techinical Specification, European Telecommunications Standards Institute (ETSI), 650, Route Des Lucioles; F-06921 Sophia-Antipolis; France, vol. 3GPP RAN, No. V15.16.0 21, Jan. 2022, 537 pages.

* cited by examiner

1600

APPARATUS FOR ANTENNA SWITCHING IN WIRELESS COMMUNICATION SYSTEM AND OPERATING METHOD THEREOF

CROSS-REFERENCE TO RELATED APPLICATIONS

This application is based on and claims priority under 35 U.S.C. § 119 to Korean Patent Application No. 10-2022-0030330, filed on Mar. 10, 2022, and Korean Patent Application No. 10-2022-0095688, filed on Aug. 1, 2022, in the Korean Intellectual Property Office, the disclosures of which are incorporated by reference herein in their entireties.

TECHNICAL FIELD

This disclosure relates generally to adaptive antenna switching in a wireless communication system.

DISCUSSION OF RELATED ART

An increase in data throughput in wireless communication between wireless devices (e.g., a user equipment (UE) and a base station) may be achieved through use of adaptive antenna switching according to the channel state between the wireless devices. Such antenna switching may improve the stability of communication among the wireless devices.

In carrier aggregation (CA), multiple frequency bands, each referred to as a component carrier, are assigned to an end user device and concurrently used for data communication to thereby increase data throughput. In the case of a multiple-input and multiple-output (MIMO) system, multiple antennas are used at both the UE and the base station to increase capacity of wireless communication data and increase data throughput by forming multiple beams, each carrying a different data stream referred to as a "layer". Different layers may be transmitted with different respective polarizations and/or spatial paths (due to multipath reflections). MIMO based communication may also be used in conjunction with a CA scheme utilizing a plurality of component carriers. To this end, the CA scheme may designate a "target component carrier" as a component carrier for which most (e.g., a majority of) communication resources of the user device are allocated, among all the component carriers. However, when the quality of a channel of a target component carrier (the channel state measured at the target component carrier frequencies) deteriorates, the data throughput between the wireless devices through the target component carrier decreases. As a result, the communication performance of the entire wireless communication system may deteriorate.

SUMMARY

Embodiments of the inventive concept provide a user equipment (UE) configured to improve wireless communication performance with a base station by changing reception antenna setting by identifying channel deterioration based on respective channel states of a plurality of component carriers in a wireless communication system, and requesting (e.g., a base station) to change layer allocation information of the plurality of component carriers.

Embodiments also provide a UE which, when channel deterioration is identified based on a channel state of a plurality of component carriers in a wireless communication system, tests in advance a channel state of antenna setting to be changed by the user equipment and then changes layer allocation to thereby efficiently change antenna setting of the plurality of component carriers based on channel state information measured in advance.

Embodiments also provide a base station which improves the wireless communication performance with a UE through adaptive change of antenna setting of a user equipment by identifying channel deterioration based on respective channel states of a plurality of component carriers in a wireless communication system and transmitting, to the user equipment, a signal indicating to change layer allocation information of the plurality of component carriers.

According to an aspect of the inventive concept, there is provided a user equipment including a plurality of antennas including at least first and second groups of antennas, each group respectively allocated to one of a plurality of component carriers according to layer allocation information of the plurality of component carriers, a radio frequency integrated circuit (RFIC) configured to transmit or receive a signal at frequencies of the plurality of component carriers through the plurality of antennas, and a processor configured to measure respective channel states of the plurality of component carriers, generate a request to change the layer allocation information of the plurality of component carriers, based on the channel states, and control the RFIC to transmit the request to change, to the base station.

According to another aspect of the inventive concept, there is provided a base station including a plurality of antennas including at least first and second groups of antennas, each group respectively allocated to one of a plurality of component carriers according to layer allocation information of the plurality of component carriers, an RFIC configured to transmit or receive a signal through the plurality of component carriers by using the plurality of antennas, and a processor configured to receive information about respective channel states of the plurality of component carriers from a user equipment, determine whether to change a number of layers allocated to one or more of the plurality of component carriers, based on the information about the channel states, and control the RFIC to transmit changed layer allocation information of the plurality of component carriers, to the user equipment, when the number of allocated layers is changed.

According to another aspect of the inventive concept, there is provided an operating method of a wireless communication system including a user equipment and a base station, the operating method including receiving, by the user equipment, a channel test message for a plurality of component carriers from the base station, allocating, by the user equipment, a respective number of antennas to each of the plurality of component carriers according to a first layer combination of the plurality of component carriers of the channel test message, measuring, by the user equipment, based on the channel test message, respective channel states of the plurality of component carriers, transmitting, by the user equipment, a report on the channel test to the base station, and restoring, by the user equipment, the plurality of component carriers to a previous number of allocated antennas according to previous layer allocation information of the plurality of component carriers, based on the report on the channel test.

BRIEF DESCRIPTION OF THE DRAWINGS

Embodiments will be more clearly understood from the following detailed description taken in conjunction with the accompanying drawings in which.

DETAILED DESCRIPTION OF EMBODIMENTS

Hereinafter, embodiments of the inventive concept will be described in detail with reference to the attached drawings.

For convenience of description, herein, some of terms and names defined by the 3rd Generation Partnership Project Long Term Evolution (3GPP LTE) standard or the New Radio (NR) standard are used. However, the inventive concept is not limited to systems with features defined by these terms and names, and may be equally applied to wireless communication systems conforming to other standards.

A base station (BS) device according to an embodiment may refer to a fixed station which communicates with a user equipment and/or other base stations. For example, the base station may be referred to as a Node B, an evolved-Node B (eNB), a sector, a site, a base transceiver system (BTS), an access point (AP), a relay node, a remote radio head (RRH), a radio unit (RU), or the like.

A terminal according to an embodiment may be referred to as, for example, a user equipment, a mobile station (MS), a mobile terminal (MT), a user terminal, a subscribe station (SS), a wireless device, a handheld device, or the like. Hereafter the term "user equipment" will be mainly used as an example of a terminal.

Figure 1:
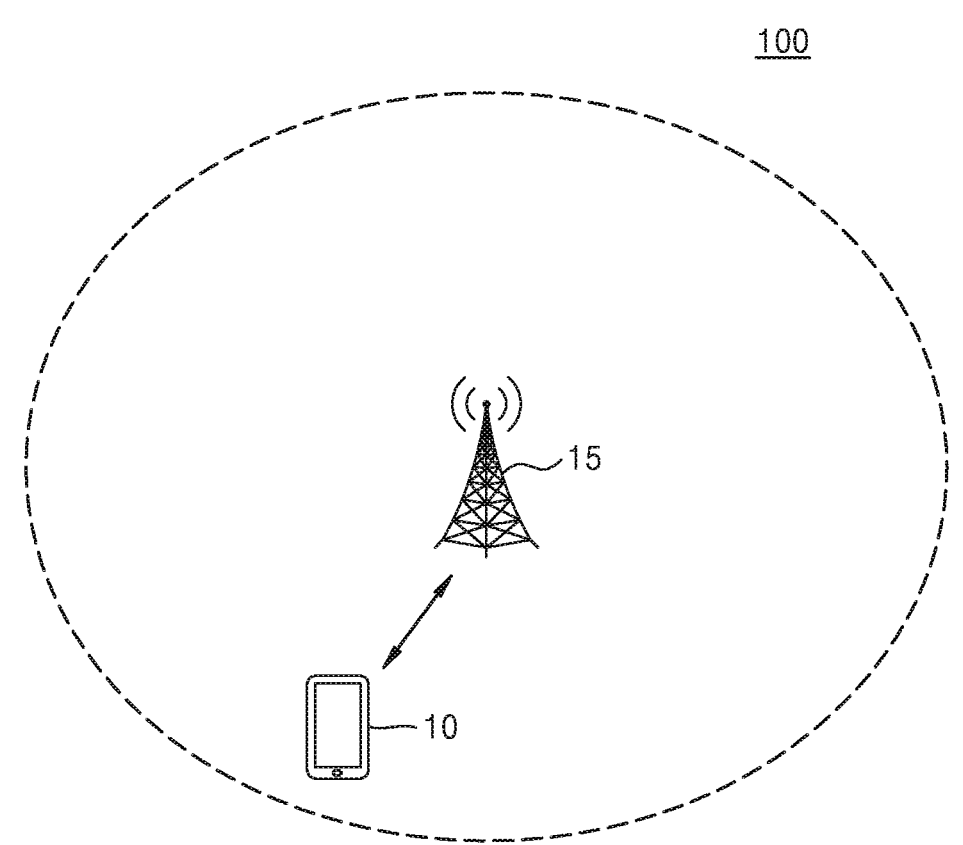
FIG. 1 illustrates an example of a wireless communication system according to an embodiment.

FIG. 1 illustrates an example of a wireless communication system 100 according to an embodiment.

Referring to FIG. 1, the wireless communication system 100 may include a base station (BS) 15 and a user equipment (UE) 10.

Non-limiting examples of the wireless communication system 100 may include a New Radio (NR) system, a 5th Generation (5G) system, a Long Term Evolution (LTE) system, a Code Division Multiple Access (CDMA) system, a Global System for Mobile Communications (GSM) system, a Wireless Local Area Network (WLAN) system, or any other wireless communication systems. Hereinafter, description will be provided on the assumption that the wireless communication system 100 is an NR system or an LTE system or a system capable of supporting NR and LTE-based communication, but it will be understood that the inventive concept is not limited thereto.

The base station 15 may support a 4G communication (e.g., LTE, LTE-advanced (A), 5G communication (e.g., NR), etc. defined in the 3GPP standard.

For example, for 4G communication and 5G communication, the base station 15 may support CDMA-based communication protocol, a wideband CDMA (WCDMA)-based communication protocol, a time division multiple access (TDMA) based Communication protocol, FDMA (frequency division multiple access (FDMA) based communication protocol, OFDM (orthogonal frequency division multiplexing (OFDM) based communication protocol, cyclic prefix (CP)-OFDM based communication protocol, discrete Fourier transform-spread-OFDM (DFT-s-OFDM)-based communication protocol, non-orthogonal Multiple Access (NOMA), generalized frequency division multiplexing (GFDM)-based communication protocol, etc.

In the wireless communication system 100, a cell (e.g., the dotted line surrounding the base station 15) is a minimum unit of an area for providing a communication service for each base station, and includes at least one base station. The base station 15 may provide efficient multiple access communication for a plurality of user equipments, based on a specific frequency resource allocated to each cell. In the case of a carrier aggregation based multiple-input and multiple-output (MIMO) system, the user equipment 10 and the base station 15 may perform wireless communication through use of a plurality of component carriers.

The user equipment 10 may transmit capability information of the user equipment 10 to the base station 15 to inform the base station 15 of perform wireless communication. The capability information of the user equipment 10 may include information about a combination of index numbers (hereafter, "numbers") of antennas that are allocated to the plurality of component carriers and capable of reception.

For example, the 3GPP Technical Specification TS 38.331 V15.7.0 Release 15 (hereafter, "TS 38.331") specifies the Radio Resource Control protocol for the radio interface between the UE and the radio access network. Referring to TS 38.331, the UE 10 may transmit a combination of the numbers of possible reception antennas for each component carrier to the base station 15 through a message called 'FeatureSetDownlinkPerCC'.

With reference to TS 38.331, the capability information of the user equipment 10 transmitted to the base station 15 is as shown in Table 1:

TABLE 1

```
- FeatureSetDownlinkPerCC
The IE FeatureSetDownlinkPerCC indicates a set of features that the UE supports
on the corresponding carrier of one band entry of a band combination.
                  FeatureSetDownlinkPerCC information element
```

```
-- ASN1START
-- TAG-FEATURESETDOWNLINKPERCC-START
FeatureSetDownlinkPerCC ::=            SEQUENCE {
    supportedSubcarrierSpacingDL           Subcarrierspacing,
    supportedBandwidthDL                   SupportedBandwidth,
    channelBK-90MHz                   ENUMERATED { supported }   OPTIONAL,
    maxNumberMIMO-LayersPDSCH              MIMO-LayersDL          OPTIONAL,
    supportedModulationOrderDL             ModulationOrder        OPTIONAL
}
FeatureSetDownlinkPerCC-v1620 ::=      SEQUENCE {
    -- R1 16-2a: Mulit-DCI based multi-TRP
    multiDCI-MultiTRP-r16                  MultiDCI-MultiTRP-r16  OPTIONAL,
    -- R1 16-2b-3: Support of single-DCI based FDMSchemeBy
    supportFDM-SchemeB-r16            ENUMERATED {supported}   OPTIONAL
}
MultiDCI-MultiTRP-r16 ::=             SEQUENCE {
    maxNumberCORESET-r16                 ENUMERATED { n2, n3, n4, n5 },
    maxNumberCORESETPerPoolIndex-r16    INTEGER (1..3),
    maxNumberUnicastRDSCH-PerPool-r16   ENUMERATED { n1, n2, n3, n4, n7 }
}
-- TAG-FEATURESETDOWNLINKPERCC-STOP
-- ASN1STOP
```

The base station 15 may receive capability information from the user equipment 10. The base station 15 may identify a combination of the numbers of possible reception antennas (e.g., the maximum number of reception antennas) for each of a plurality of component carriers from the capability information of the user equipment 10. The base station 15 may transmit a signal including information about the maximum number of layers (data streams) allocated to each of the plurality of component carriers, based on the capability information of the user equipment 10.

For example, referring to TS 38.331, the base station 15 may transmit layer allocation information (e.g., MaxMIMO-Layers) of each of the plurality of component carriers in a Radio Resource Control (RRC) message. As seen below, referring to TS 38.331, layer allocation information for each of the plurality of component carriers transmitted from the base station 15 is as shown in Table 2.

TABLE 2

| -- TAG-PDSCH-SERVINGCELLCONFIG-START | | | |
|---|---|---|---|
| PDSCH-ServingCellConfig ::= | SEQUENCE { | | |
| codeBlockGroupTransmission | SetupRelease { PDSCH-CodeBlockGroupTransmission } | OPTIONAL, | -- Need M |
| xOverhead | ENUMERATED { xOh6, xOh12, xOh18 } | OPTIONAL, | -- Need S |
| nrofHARQ-ProcessesForPDSCH | ENUMERATED { n2, n4, n6, n10, n12, n16 } | OPTIONAL, | -- Need S |
| pucch-Cell | ServCellIndex | OPTIONAL, | -- Cond SCellAddOnly |
| ..., | | | |
| [[ | | | |
| maxMIMO-Layers | INTEGER (1..8) | OPTIONAL, | -- Need M |
| processingType2Enabled | BOOLEAN | OPTIONAL | -- Need M |
| ]], | | | |
| [[ | | | |
| pdsch-CodeBlockGroupTransmissionList-r16 SetupRelease { PDSCH-CodeBlockGroupTransmissionList-r16 } | | OPTIONAL | -- Need M |
| ]] | | | |
| } | | | |
| PDSCH-CodeBlockGroupTransmission ::= | SEQUENCE { | | |
| maxCodeBlockGroupsPerTransportBlock | ENUMERATED { n2, n4, n6, n8 }, | | |
| codeBlockGroupFlushIndicator | BOOLEAN, | | |
| ... | | | |
| } | | | |
| PDSCH-CodeBlockGroupTransmissionList-r16 ::= | SEQUENCE (SIZE (1..2)) OF PDSCH-CodeBlockGroupTransmission | | |
| -- TAG-PDSCH-SERVINGCELLCONFIG-STOP | | | |
| -- ASN1STOP | | | |

For example, consider an example in which the maximum possible number of reception antennas of the user equipment 10 is '6'. That is, a situation where the maximum number of MIMO layers capable of reception by the user equipment 10 is '6' may be assumed.

The user equipment 10 may transmit, as capability information, information about a combination of the maximum possible numbers of reception antennas for the plurality of component carriers, to the base station 15. The capability information of the user equipment 10 may be as shown in Table 3 below.

TABLE 3

| | CC0 | CC1 |
|---|---|---|
| Combination #0 | 'maxNumberMIMO-LayersPDSCH' = 4 | 'maxNumberMIMO-LayersPDSCH' = 2 |
| Combination #1 | 'maxNumberMIMO-LayersPDSCH' = 2 | 'maxNumberMIMO-LayersPDSCH' = 4 |

Here, for Combination #0 among the capability information of the user equipment 10, the maximum possible number of MIMO layers in a first component carrier CC0 is 4, and the maximum possible number of MIMO layers in a second component carrier CC1 is 2.

For Combination #1 among the capability information of the user equipment 10, the maximum possible number of MIMO layers in the first component carrier CC0 is 2, and the maximum possible number of MIMO layers in the second component carrier CC1 is 4.

For example, as shown in Table 4 below, the base station 15 may allocate one or more layers for each component carrier by selecting Combination #0 from among the two combinations of capability information of the user equipment 10.

TABLE 4

| | CC0 | CC1 |
|---|---|---|
| maxMIMO-Layers | 4 | 2 |

The base station 15 may transmit, to the user equipment 10, a signal (e.g., an RRC message) including layer allocation information of each component carrier, the layer allocation information corresponding to Table 4. As noted earlier, a target component carrier refers to a component carrier to which a largest number of layers is allocated among a plurality of component carriers.

For example, by allocating four layers, which is the largest number in this example, to the first component carrier CC0, the base station 15 may perform communication with the user equipment 10 by using the first component carrier CC0 as a target component carrier.

The user equipment 10 may set the number of reception antennas for each component carrier based on layer allocation information of each component carrier, received from the base station 15. For example, based on the layer allocation information of each component carrier, the user equipment 10 may set four reception antennas to the first component carrier CC0, which is the target component carrier, and set two reception antennas to the second component carrier CC1.

However, when a channel state of the first component carrier CC0, which is the target component carrier, has deteriorated, a problem may arise in wireless communication between the user equipment 10 and the base station 15.

A channel state of each component carrier may be indicated by a rank indicator (RI) or a channel quality indicator (CQI) of the component carriers. In general, an RI is an indication of how well a MIMO setup is working. A maximum RI may correspond to the lowest number of antennas among the number of antennas on the transmitting and receiving sides. For instance, if there are four antennas on each of the transmitting and receiving sides, the maximum RI is four. For example, when the maximum RI is four, when four data streams carried within the same component carrier, transmitted through four antennas, can be efficiently received independently through polarization diversity and/or spatial diversity, the measured RI may equal four. On the other hand, if channel conditions are not favorable for polarization/spatial diversity, when four data streams are transmitted, data throughput may only be comparable to a case in which three or fewer data streams are transmitted (under better channel conditions). In this case, the RI may correspondingly be three or less. The CQI is an indicator of channel quality and may have a scalar value from 0 to 15. The CQI may provide information about the highest modulation and coding scheme (MCS) suitable for a downlink transmission to achieve a requisite block error rate (BLR) for given channel conditions.

For example, when an RI of the first component carrier CC0, which is the target component carrier, is less than a threshold value, the user equipment 10 or the base station 15 may identify the channel state of the first component carrier CC0 as having deteriorated.

The user equipment 10 may have degraded wireless communication performance with respect to the base station 15 due the deterioration in the channel state of the first component carrier CC0, which is the target component carrier.

As the channel state of the first component carrier CC0 deteriorates, the base station 15 may become unable to immediately change or reset layer allocation information of each component carrier through RRC signaling.

Even when antenna switching is performed to change the number of antennas allocated to a plurality of component carriers, by the base station 15, when a channel state of the changed target component carrier is still identified as being in a deteriorated state, antenna switching time or power resources may be wasted.

Figure 8:
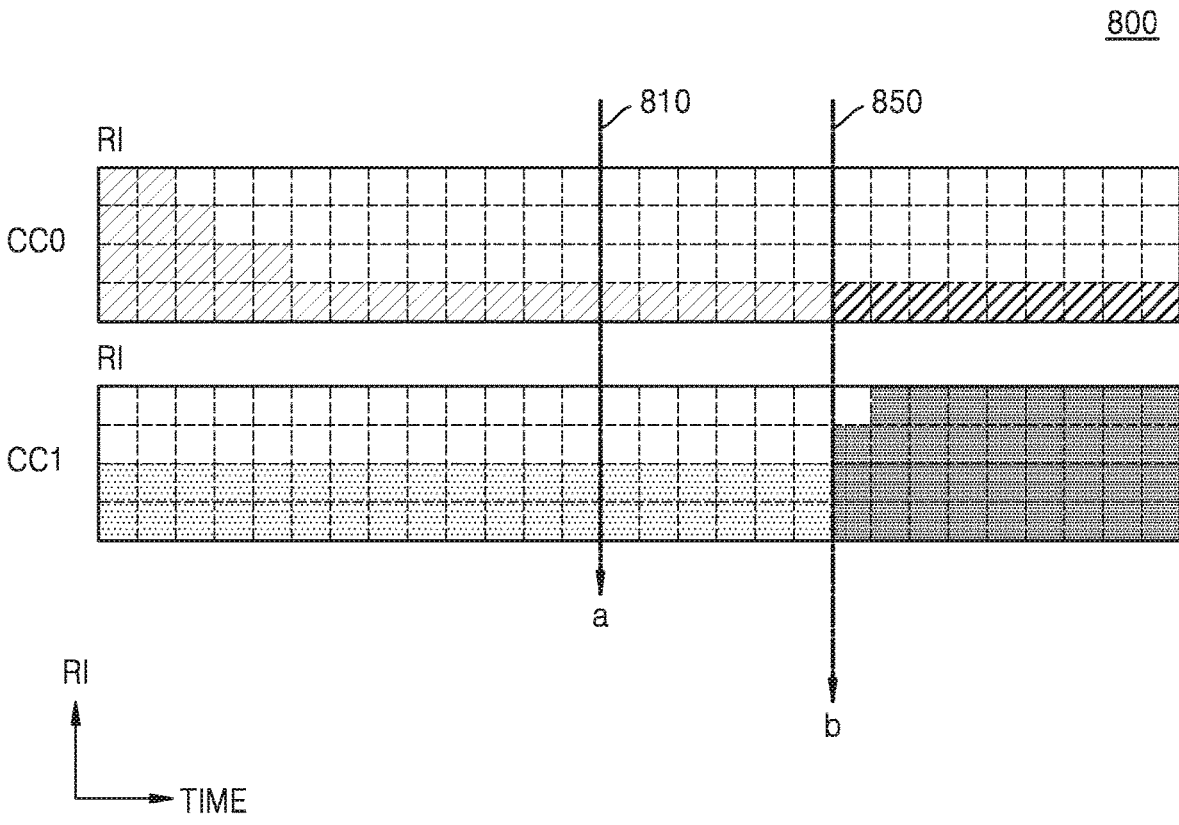
FIG. 8 is a diagram illustrating antenna switching of a user equipment according to deterioration in a channel state, according to an embodiment.
Figure 14:
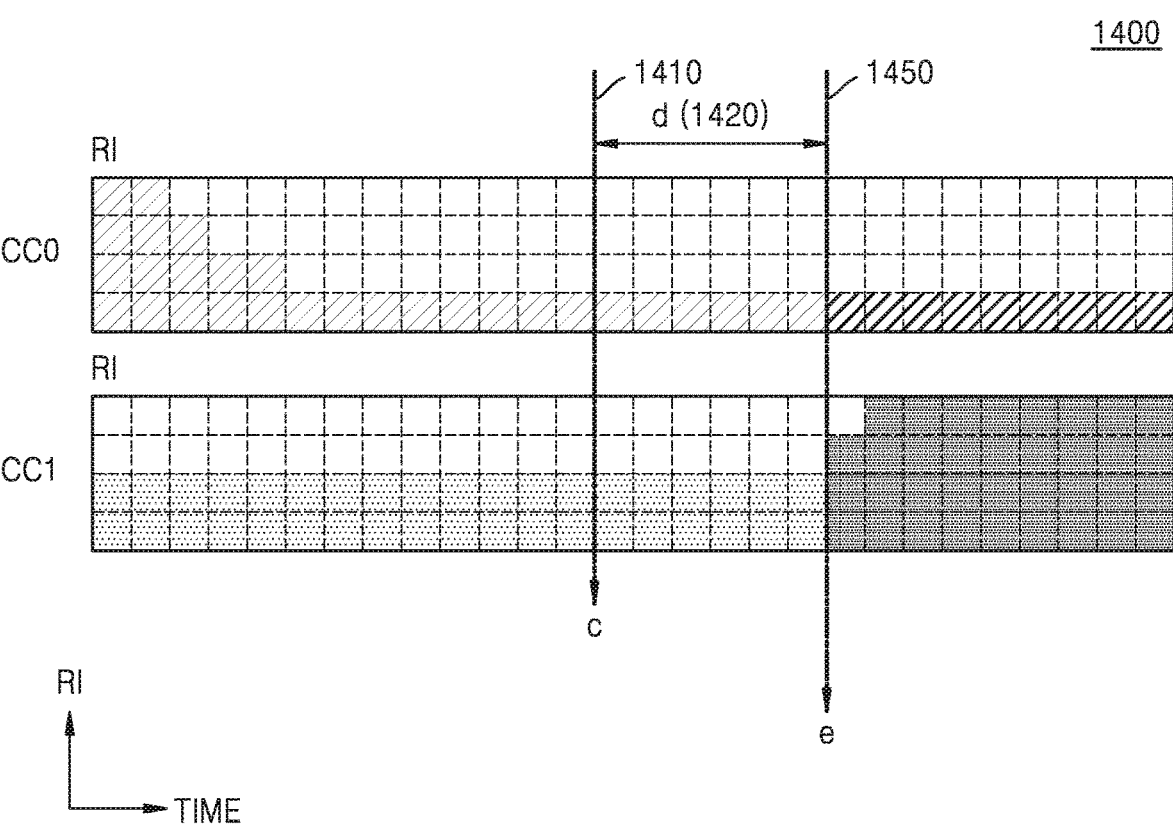
FIG. 14 is a diagram illustrating antenna switching by a base station, according to deterioration in a channel state, according to an embodiment.

Embodiments herein alleviate or obviate the above problems by switching a reception antenna of a UE through layer allocation information of a plurality of component carriers, where the layer allocation information is changed based on a channel state of a target component carrier in the wireless communication system. For instance, according to embodiments, instead of automatically initiating a change in the target component carrier when the channel state of the target component carrier deteriorates, a determination is made as to whether a change in the target component carrier would improve the communication performance, if so, a change in the target component carrier is initiated. For example, a change may be initiated when channel state of the target component carrier deteriorates below that of another component carrier (as illustrated in FIGS. 8 and 14). In another example, a change is initiated when it is determined that total data throughput would increase if the change is made.

Figure 2:
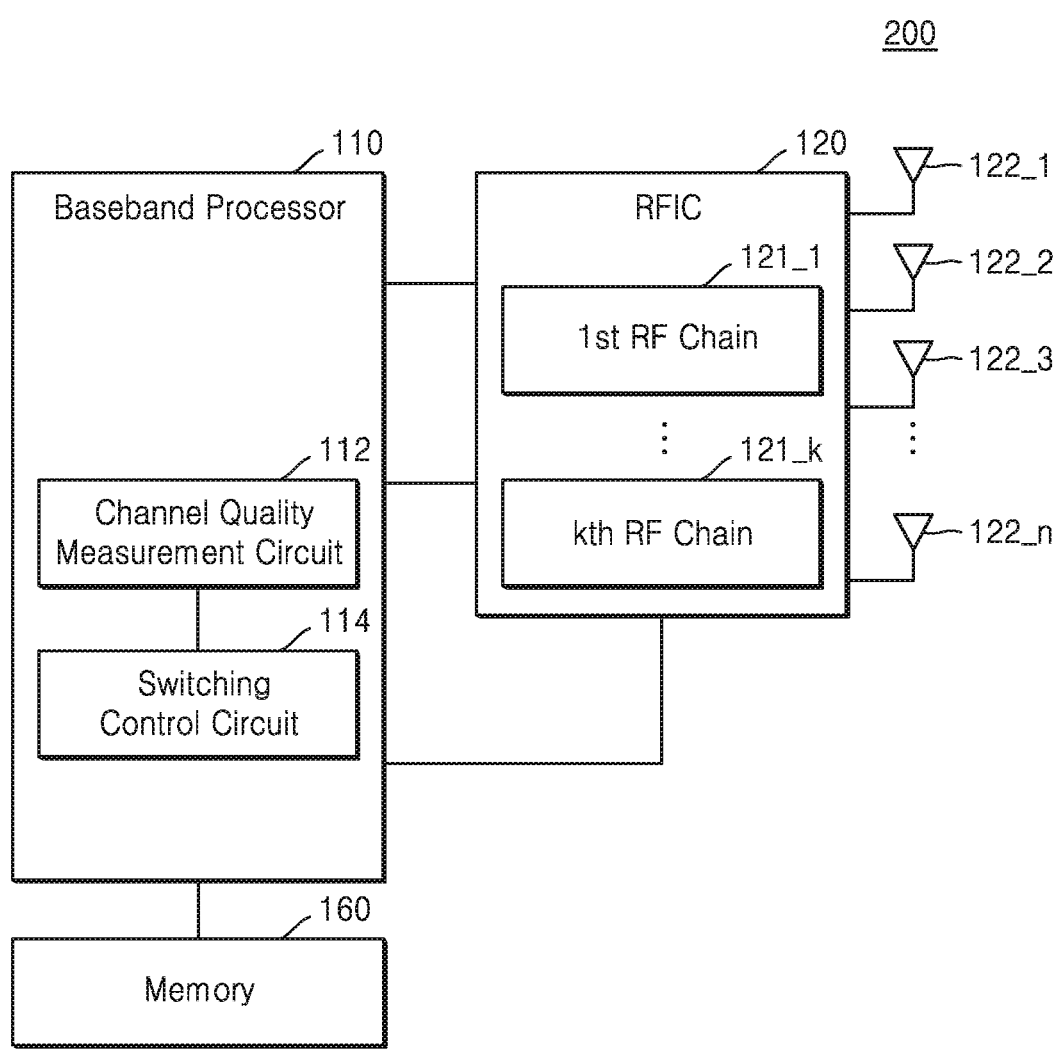
FIG. 2 is a block diagram illustrating a wireless communication apparatus according to an embodiment.

FIG. 2 is a block diagram illustrating a wireless communication apparatus 200 according to an embodiment. The wireless communication apparatus 200 of FIG. 2 may correspond to the user equipment 10 of FIG. 1.

Referring to FIG. 2, the wireless communication apparatus 200 may include a baseband processor 110, a radio frequency integrated circuit (RFIC) 120, and a memory 160. The wireless communication apparatus 200 may identify a channel state of a plurality of component carriers, and when channel deterioration in a target component carrier is identified, the wireless communication apparatus 200 may send a request to a base station to change layer allocation information of the plurality of component carriers, and/or may receive, from the base station, a message for changing layer allocation information of the plurality of component carriers. The wireless communication apparatus 200 may adaptively change antenna settings of the plurality of component carriers of the user equipment 10 according to the channel state by changing the number of reception antennas for each of the plurality of component carriers according to the changed layer allocation information.

The baseband processor 110 may control overall operations of the wireless communication apparatus 200. For example, the baseband processor 110 may include a channel quality measurement circuit 112 and a switching control circuit 114. The channel quality measurement circuit 112 and the switching control circuit 114 may be implemented as hardware and/or with processing circuitry executing software. Operations of the channel quality measurement circuit 112 and the switching control circuit 114 to be described below may be understood as operations of the baseband processor 110.

When performing communication with a base station or other devices, the channel quality measurement circuit 112 may measure the channel quality of a plurality of component carriers to identify whether a channel of a target component carrier among the plurality of component carriers has deteriorated. As noted earlier, the target component carrier may refer to a component carrier to which a largest number of layers (data streams) are allocated among the plurality of component carriers, e.g., in a carrier aggregation (CA) communication scheme.

The channel quality measurement circuit 112 may measure states of a channel for receiving a signal through each of the plurality of component carriers, and may generate indicators indicating a channel state of each of the plurality of component carriers based on the measured channel states.

For example, the channel quality measurement circuit 112 may measure, with respect to the channel state of received signals, at least one of an RI, a CQI, Reference Signal Received Power (RSRP), Reference Signal Received Quality (RSRQ), Signal to Interference plus Noise Ratio (SINR), Received Signal Strength Indicator (RSSI), a reference signal-related correlation or variable gain index, and a total data throughput of each of the component carriers for each channel state.

The switching control circuit 114 may control antenna switching of the RFIC 120 by allocating first to n-th antennas 122_1 to 122_n for each of the plurality of component carriers, based on the received layer allocation information to perform communication with a base station or other type of wireless device(s). The RFIC 120 may include first to kth RF chains 121_1 to 121_k corresponding to RF resources. The switching control circuit 114 may control connection between the first to kth RF chains 121_1 to 121_k and the first to nth antennas 122_1 to 122_n, according to the layer allocation information received from the base station.

The switching control circuit 114 may control the connection between a selected antenna and an RF chain, based on the layer allocation information received from the base station. For example, the switching control circuit 114 may perform, based on the layer allocation information received from the base station, an antenna switching operation by releasing the connection between the selected antenna and the RF chain and closing the connection between other antennas and the RF chain.

The RFIC 120 may include a plurality of signal paths by including the plurality of RF chains 121_1 to 121_k and the plurality of antennas 122_1 to 122_n connectable thereto. The plurality of signal paths may be distinguished for each of the plurality of component carriers.

For example, the RFIC 120 may include, as the plurality of signal paths, a first path circuit based on the first RF chain 121_1 and a second path circuit based on the kth RF chain 121_k. Here, the first path circuit may transmit/receive data between the user equipment and the base station through a first component carrier, and the second path circuit may transmit/receive data through a second component carrier.

For example, the RFIC 120 may support communication in a millimeter wave band and/or in a lower frequency band (e.g., a microwave band). The plurality of RF chains 121_1 to 121_k of the RFIC 120 may be selectively connected to the plurality of antennas 122_1 to 122_n.

The memory 160 may store information used for control of connection between the plurality of RF chains 121_1 to 121_k of the RFIC 120 and the plurality of antennas 122_1 to 122_n. For example, the channel quality measurement circuit 112 and the switching control circuit 114 may be implemented through use of software stored in the memory 160 in the form of code. Switching history information may also be stored in the memory 160.

For example, the memory 160 may be implemented as a volatile memory such as static random access memory (SRAM). For example, the memory 160 may be implemented as a volatile memory such as a dynamic random access memory (DRAM), or a nonvolatile memory such as read-only memory (ROM) or a flash memory, a resistive random access memory (ReRAM), or a magnetic random access memory (MRAM).

It is noted here that the implementation example of the wireless communication apparatus 200 illustrated in FIG. 2 is merely one embodiment. Various implementations suitable for performing operation based on the inventive concept may be alternatively applied.

Figure 3A:
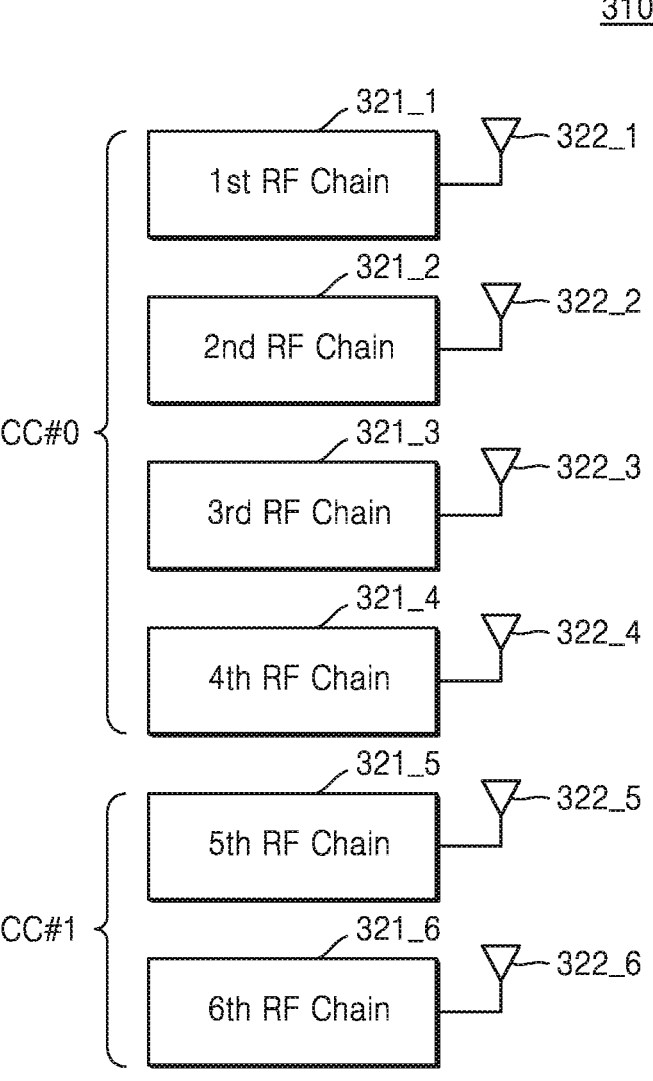
FIGS. 3A and 3B illustrate implementation examples of antenna settings allocated to a plurality of component carriers.
Figure 3B:
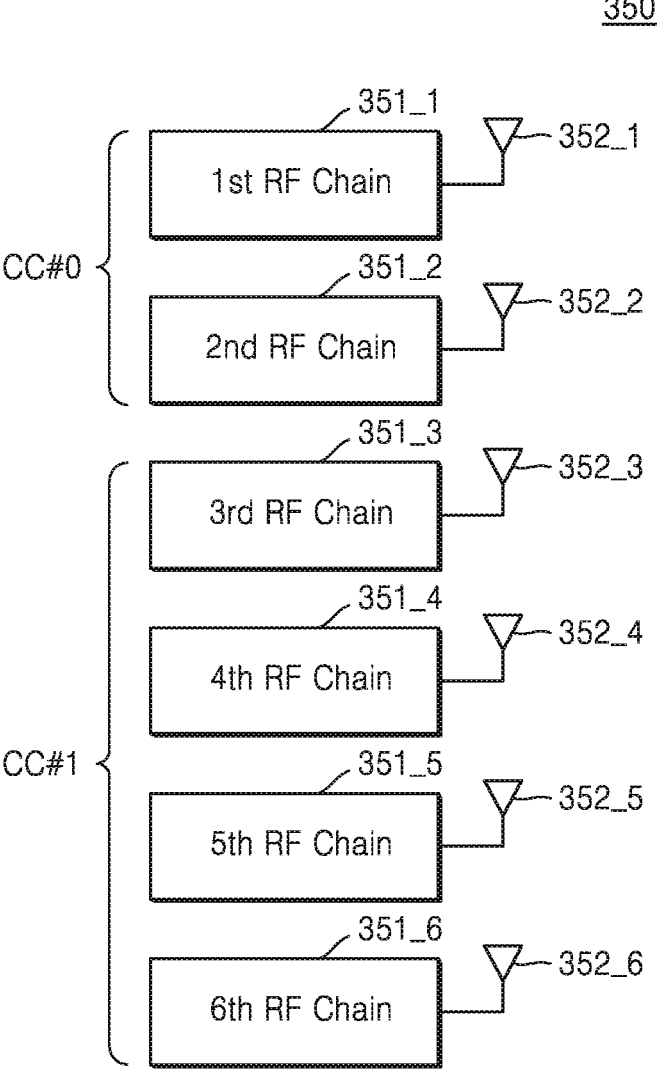

FIGS. 3A and 3B illustrate implementation examples of antenna settings 310 and 350 of a user equipment allocated to a plurality of component carriers.

In detail, a detailed implementation example of allocation of RF chains and antennas to each of a plurality of component carriers based on the layer allocation information in the RFIC 120 of FIG. 2 is illustrated. Any of the antennas 322 and 352 may be an antenna array including a plurality of antenna elements.

Referring to FIG. 3A, there is shown an implementation example of allocating the number of reception antennas to a plurality of component carriers based on "first layer allocation information". The example assumes that the RFIC 120 of the user equipment includes a plurality of RF chains 321_1 to 321_6 and a plurality of antennas 322_1 to 322_6, and the plurality of RF chains 321_1 to 321_6 are respectively connected to the plurality of antennas 322_1 to 322_6 to respectively correspond thereto.

The user equipment may allocate a maximum number of reception antennas for each of the plurality of component carriers based on layer allocation information received from the base station.

For example, when a maximum of four layers are allocated to a first component carrier CC #0, the user equipment may allocate a maximum of four antennas to the first component carrier CC #0. To this end, the user equipment may allocate, to the first component carrier CC #0, a first group of antennas, e.g., the first to fourth antennas 322_1 to 322_4 respectively connected to first to fourth RF chains 321_1 to 321_4.

For example, when a maximum of two layers are allocated to a second component carrier CC #1, the user equipment may allocate a maximum of 'two' antennas to the first component carrier CC #1. To this end, the user equipment may allocate, to the second component carrier CC #1, a second group of antennas, e.g., the fifth to sixth antennas 322_5 to 322_6 respectively connected to fifth to sixth RF chains 321_5 to 321_6.

FIG. 3B illustrates an implementation example in which the number of reception antennas allocated to the plurality of component carriers has changed, based on "second layer allocation information" generated by the base station based on change in a channel state after communication using the first layer allocation information. The example assumes that the RFIC 120 of the user equipment includes a plurality of RF chains 351_1 to 351_6 and the user equipment includes a plurality of antennas 352_1 to 352_6 respectively connected to the plurality of RF chains 351_1 to 351_6. Note that the RF chains 351_1 to 351_6 may be the RF chains 321_1 to 321_6, respectively, and the antennas 352_1 to 352_6 may be the antennas 321_1 to 321_6, respectively.

The user equipment may change the maximum number of reception antennas for each of the plurality of component carriers, based on the layer allocation information changed by the base station.

For example, when the first component carrier CC #0 is changed to a maximum of two layers, the user equipment may change the first component carrier CC #0 to a maximum of two antennas. In detail, the user equipment may allocate, to the first component carrier CC #0, a third group of antennas, e.g., the first to second antennas 352_1 to 352_2 respectively connected to first to second RF chains 351_1 to 351_2.

For example, when a maximum of four layers are allocated to the second component carrier CC #1, the user equipment may allocate a maximum of four antennas to the first component carrier CC #0. In detail, the user equipment may allocate, to the second component carrier CC #1, a fourth group of antennas, e.g., the third to sixth antennas 352_3 to 352_6 respectively connected to the third to sixth RF chains 351_3 to 331_6.

The implementation examples of allocating the number of antennas to each of the plurality of component carriers of FIGS. 3A and 3B are merely an embodiment, and thus, the inventive concept is not limited thereto, and various implementations suitable for a wireless communication system are applicable.

Figure 4:
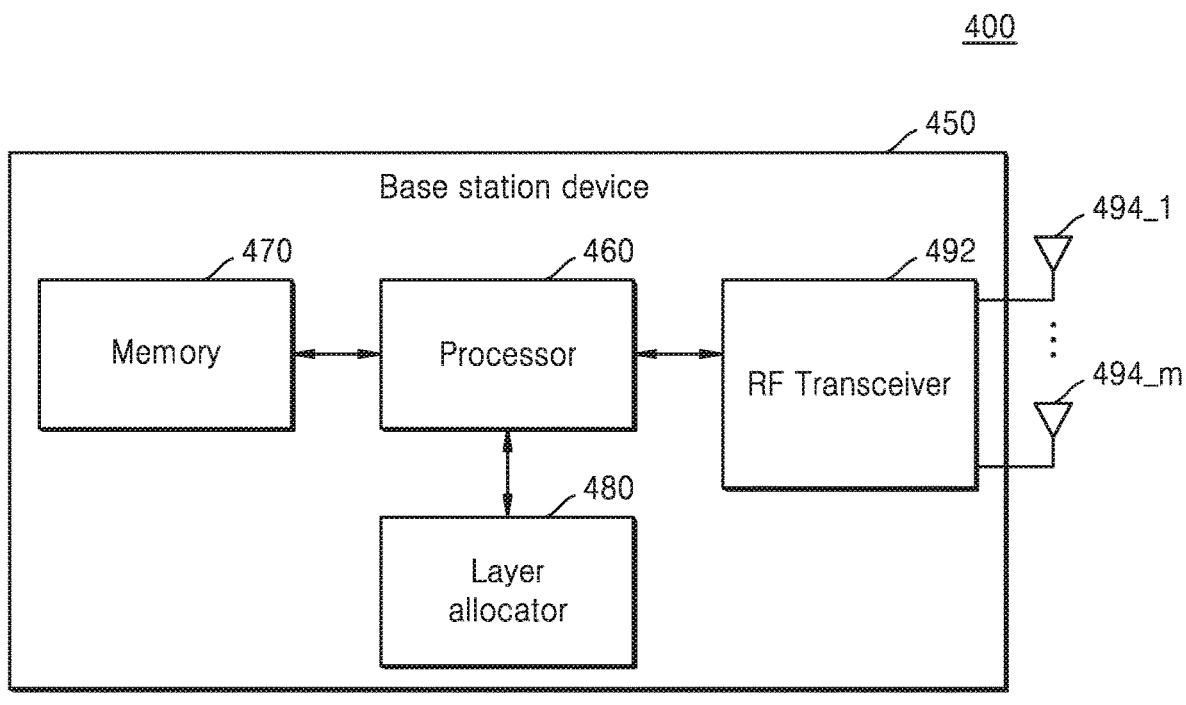
FIG. 4 is a block diagram of a base station according to an embodiment.

FIG. 4 is a block diagram of a base station 400 according to an embodiment.

Referring to FIG. 4, a base station 450 may include a processor 460, a memory 470, a layer allocator 480, an RF transceiver 492, and a plurality of antennas 494_1 to 494_m.

The RF transceiver 492 may transmit RF signals to a user equipment through serving cells through the antennas 494_1 to 494_m. The RF transceiver 492 may down-convert RF signals received from the user equipment to generate intermediate frequency or baseband signals. The processor 460 may generate data signals by filtering, decoding, and/or digitizing the intermediate frequency or baseband signals. The processor 460 may additionally process the data signals.

The RF transceiver 492 may also receive data signals from the processor 460. The RF transceiver 492 may encode, multiplex, and/or D/A convert the received data signals. The RF transceiver 492 may up-convert the intermediate frequency or baseband signals output from the processor 460 and transmit the same as RF signals through the antennas 494_1 to 494_m.

The memory 470 may include an operating system and may include applications and/or process registers including device drivers, executable libraries, and/or program codes. The operating system and applications are software elements and may be implemented by executing code and/or instructions by a processor. For example, the memory 470 may have stored therein program code executed to perform an initial layer allocation operation on a plurality of component carriers for wireless communication with a user equipment, an operation of obtaining information about a channel state of a plurality of component carriers, and an operation of changing the number of layers allocated to the plurality of component carriers, based on the information about the channel state, according to embodiments.

The layer allocator 480 may allocate the number of layers to each of the plurality of component carriers based on information about the channel state of the plurality of component carriers or capability information of the user equipment, received from the user equipment. For example, in an initial connection operation between a base station and a user equipment, the layer allocator 480 may allocate the maximum number of layers to each of the plurality of component carriers, based on the capability information of the user equipment, received from the user equipment. In the initial connection operation, the base station may allocate a first group of antennas among the antennas 494_1 to 494_m to an initial target component carrier, e.g., CC #0, and may allocate a second group of antennas among the antennas 494_1 to 494_m to another one of the plurality of component carriers, e.g., CC #1. For example, when deterioration in the channel state occurs after the initial connection between the base station and the user equipment, the layer allocator 480 may change the maximum number of layers of each of the plurality of component carriers, based on the information about the channel state of the plurality of component carriers, received from the user equipment.

The processor 460 may control the base station 450 for wireless network-based communication, and may transmit a signal including initial layer allocation information set based on the capability information of the user equipment, to the user equipment. In addition, when a change in the number of allocated layers is desirable due to deterioration in the channel state of the target component carrier among the plurality of component carriers, the processor 460 may transmit, to the user equipment, a signal including the changed layer allocation information based on the channel state of the plurality of component carriers. For example, the processor 460 configured to receive information about respective channel states of the plurality of component carriers from a user equipment, determine whether to change a number of layers allocated to one or more of the plurality of component carriers, based on the information about the channel states, and control RFIC (a radio frequency integrated circuit) (e.g., the layer allocator (480) and/or the RF transceiver (492)) to transmit changed layer allocation information of the plurality of component carriers, to the user equipment, when the number of allocated layers is changed.

The processor 460 may execute a program and/or process stored in the memory 470 to perform an overall control operation on the base station 450. In some embodiments, the processor 460 may be stored in the memory 470 as program code executed to perform an initial layer allocation operation on a plurality of component carriers for wireless communication with a user equipment, an operation of obtaining information about a channel state of the plurality of component carriers, and an operation of changing the number of layers allocated to the plurality of component carriers, based on the information about the channel state, according to embodiments, and the processor 460 may access the memory 470 to execute the stored program code to thereby transmit, to the user equipment, the layer allocation information changed based on the information about the channel state. This will be described in detail later with reference to FIGS. 12 to 14.

In addition, the processor 460 may transmit a channel test message to the user equipment to measure in advance a channel state of an antenna set based on the layer allocation information to be changed in the user equipment. This will be described in detail later with reference to FIGS. 9 to 11.

Even when a channel of a target component carrier has deteriorated, through an operation of transmitting, to the user equipment, layer allocation information changed based on the channel state of a plurality of component carriers, which are described with reference to FIGS. 9 to 14, the base station according to the inventive concept may prevent a reduction in the total data throughput of reception data on the side of the user equipment and improve the data transmission and reception performance of the wireless communication system.

Accordingly, a communication apparatus may be provided, which is capable of performing stable data transmission and reception in an actual wireless communication system in which there are various channel deteriorations caused by noise signals and interference signals from external devices.

Figure 5:
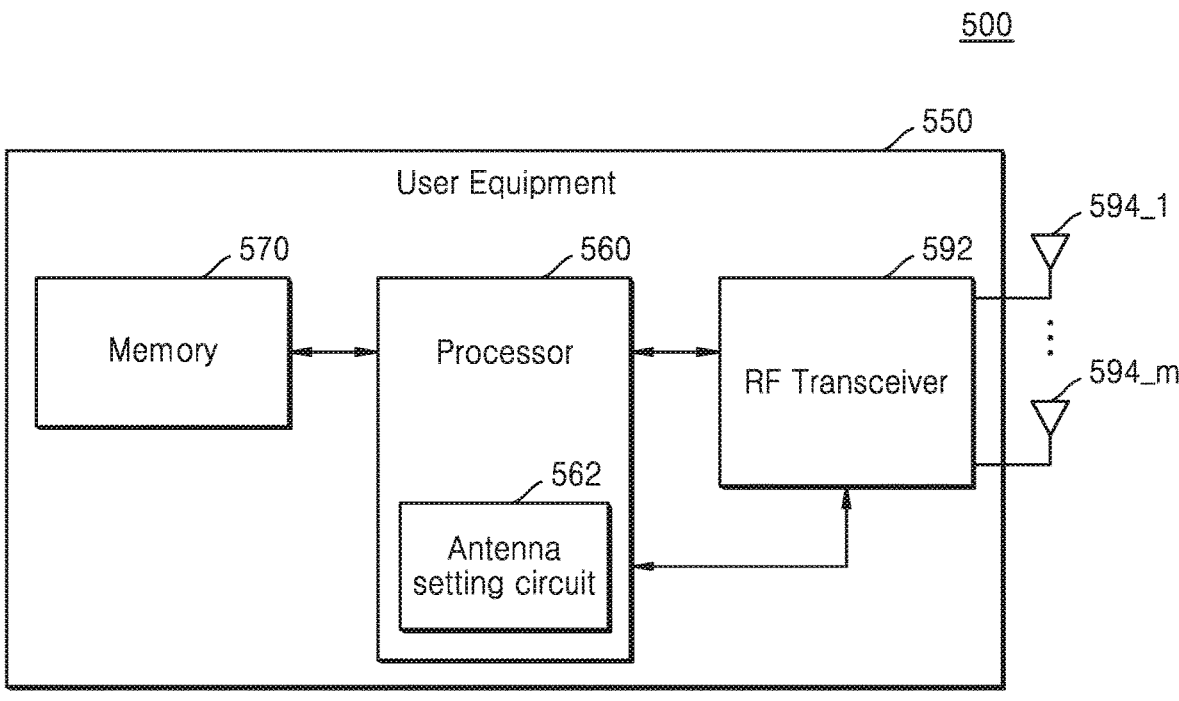
FIG. 5 is a block diagram of a user equipment according to an embodiment.

FIG. 5 is a block diagram 500 of a user equipment 550 according to an embodiment.

Referring to FIG. 5, the user equipment 550 may include a processor 560, a memory 570, an antenna setting circuit 562, an RF transceiver 592, and a plurality of antennas 594_1 to 594_m.

The RF transceiver 592 of the user equipment 550 may transmit RF signals to a base station through serving cells through the antennas 594_1 to 594_m. The RF transceiver 592 may down-convert RF signals received from the base station to generate intermediate frequency or baseband signals. The processor 560 may generate data signals by filtering, decoding, and/or digitizing the intermediate frequency or baseband signals. The processor 560 may additionally process the data signals transmitted or received to or from the base station.

The RF transceiver 592 may also receive data signals from the processor 560. The RF transceiver 592 may encode, multiplex, and/or D/A convert the received data signals. The RF transceiver 592 may up-convert the intermediate frequency or baseband signals output from the processing circuit 560 and transmit the same to the base station as RF signals through the antennas 594_1 to 594_m.

The memory 570 may include an operating system and may include applications and/or process registers including device drivers, executable libraries, and/or program codes. The operating system and applications are software elements and may be implemented by executing code and/or instructions by a processor. For example, the memory 570 may have stored therein program code executed to perform an operation of setting an initial number of antennas according to initial layer allocation information received from a base station, an operation of measuring a channel state of each of a plurality of component carriers, an operation of requesting from a base station to change the initial layer allocation information when a channel state of a target component carrier has deteriorated, and an operation of changing an antenna setting according to layer allocation information changed based on the channel state (e.g., an operation of changing a number of antennas allocated to the plurality of component carriers), according to embodiments.

The antenna setting circuit 580 may set antennas for a plurality of component carriers of the user equipment 550 based on the layer allocation information received from the base station. For example, the antenna setting circuit 580 may set the number of reception antennas (or the maximum number of reception antennas) for each of the plurality of component carriers based on the layer allocation information received from the base station. For example, when the channel state is deteriorated after the initial connection between the base station and the user equipment, the antenna setting circuit 580 may change a respective maximum number of reception antennas for each of the plurality of component carriers, based on the layer allocation information which was changed based on the information about the channel state of the plurality of component carriers.

The processor 560 may control the user equipment 550 for wireless network-based communication, and may transmit a signal including capability information of the user equipment 550, to the base station. The capability information of the user equipment may include information about a combination of the numbers of antennas capable of reception on the plurality of component carriers.

When a change of the number of allocated layers is desired due to the deterioration in the channel state of a target component carrier among the plurality of component carriers, the processor 560 may transmit, to the base station, a signal including a request to change layer allocation information, based on the channel state of the plurality of component carriers.

The processor 560 may execute a program and/or process stored in the memory 570 to perform an overall control operation on the user equipment device 550. In some embodiments, the processor 560 may be stored in the memory 570 as program code executed to perform an operation of setting an initial number of antennas for each of the plurality of component carriers according to the initial layer allocation information received from the base station, an operation of measuring a channel state of each of the plurality of component carriers, an operation of requesting, from the base station, to change the initial layer allocation information when the channel state of at least one target component carrier is deteriorated, and an operation of changing the number of antennas allocated to the plurality of component carries, according to layer allocation information changed based on the channel state, and the processor 560 may access the memory 570 to execute the stored program code to transmit, to the base station, a request to change the layer allocation information based on the information about the channel state. This will be described in detail later with reference to FIGS. 6 to 9.

In addition, to efficiently change the antenna setting, the processor 560 may measure in advance a channel state of the plurality of component carriers based on the layer allocation information to be changed, according to the channel test message received from the base station. This will be described in detail later with reference to FIGS. 9 to 11.

Even when a channel of a target component carrier has deteriorated, through an operation of transmitting, to the base station, a request to change layer allocation information based on the channel state described with reference to FIGS. 6 to 11, the base station according to the inventive concept may prevent deterioration in the data transmission and reception performance and perform stable communication by adaptively changing the antenna setting of the user equipment.

Figure 6:
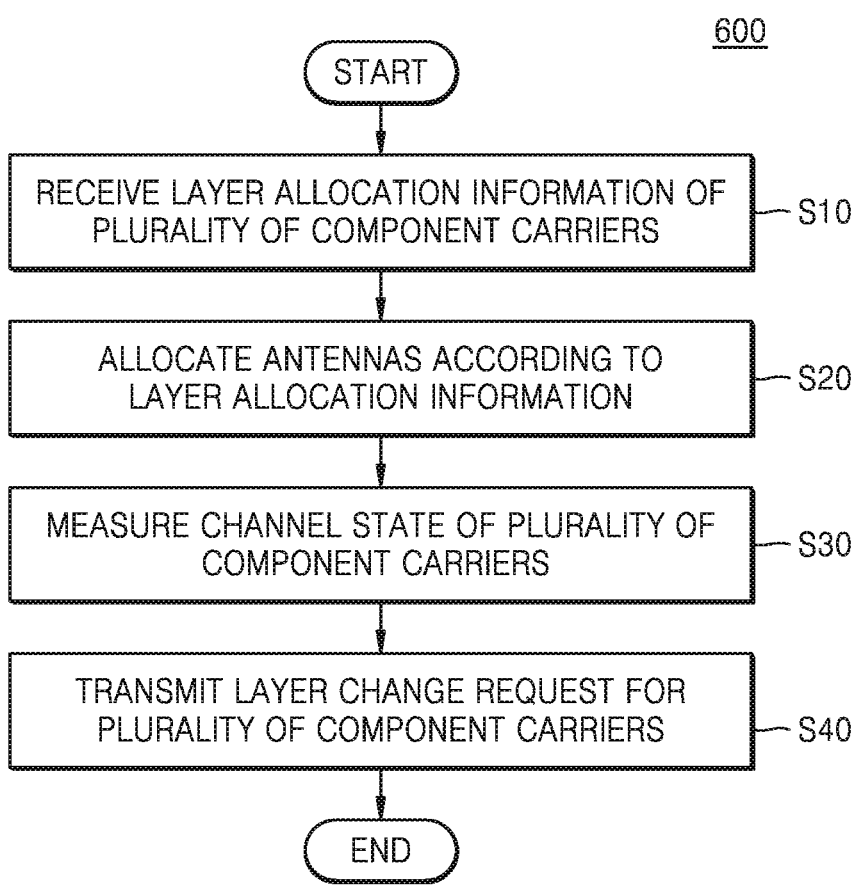
FIG. 6 is a flowchart of an operating method of a user equipment, according to an embodiment.

FIG. 6 is a flowchart 600 of an operating method of a user equipment, according to an embodiment.

In detail, FIG. 6 is a diagram for describing an operation of transmitting a signal for requesting to change layer allocation information to a base station based on a channel state of a plurality of component carriers, performed by the processor 560 of the user equipment of FIG. 5.

Referring to FIG. 6, the operation of transmitting a signal for requesting to change layer allocation information, to the base station, based on the channel state may include operations S10, S20, S30, and S40.

In operation S10, the processor may receive layer allocation information of a plurality of component carriers.

The processor may transmit capability information of the user equipment 10 to the base station 15 as an initial connection operation for performing wireless communication. The capability information of the user equipment may include information about a combination of the maximum number of reception antennas allocated to each of the plurality of component carriers, e.g., the maximum possible number of reception antennas for the plurality of component carriers.

The layer allocation information of the plurality of component carriers is information set based on the capability information of the user equipment, and may include information about the number of layers allocated to each of the plurality of component carriers (e.g., the maximum number of layers), and may be received from the base station.

In operation S20, the processor may allocate antennas according to the layer allocation information.

For example, the processor may set the number of reception antennas for each of the plurality of component carriers based on the layer allocation information of the plurality of component carriers. The maximum number of reception antennas set for each of the plurality of component carriers may be set to be greater than or equal to the number of layers allocated to each of the plurality of component carriers.

For example, when the maximum number of layers allocated to a first component carrier is four, the processor may allocate four or more reception antennas to the first component carrier.

In operation S30, the processor may measure the channel state of the plurality of component carriers. Here, the measured channel state of the plurality of component carriers may be indicated by an RI or a CQI of each of the plurality of component carriers.

In operation S40, the processor may transmit a layer change request for the plurality of component carriers. For example, based on the channel state of the plurality of component carriers, when the channel state has deteriorated, the processor may transmit a request to change the layer allocation information of the plurality of component carriers to the base station.

For example, the processor may determine whether a channel between the base station and the user equipment has deteriorated, based on the channel state of an existing target component carrier, and transmit, to the base station, a request to change the layer allocation information of the plurality of component carriers. This will be described in detail below with reference to FIG. 7.

Figure 7:
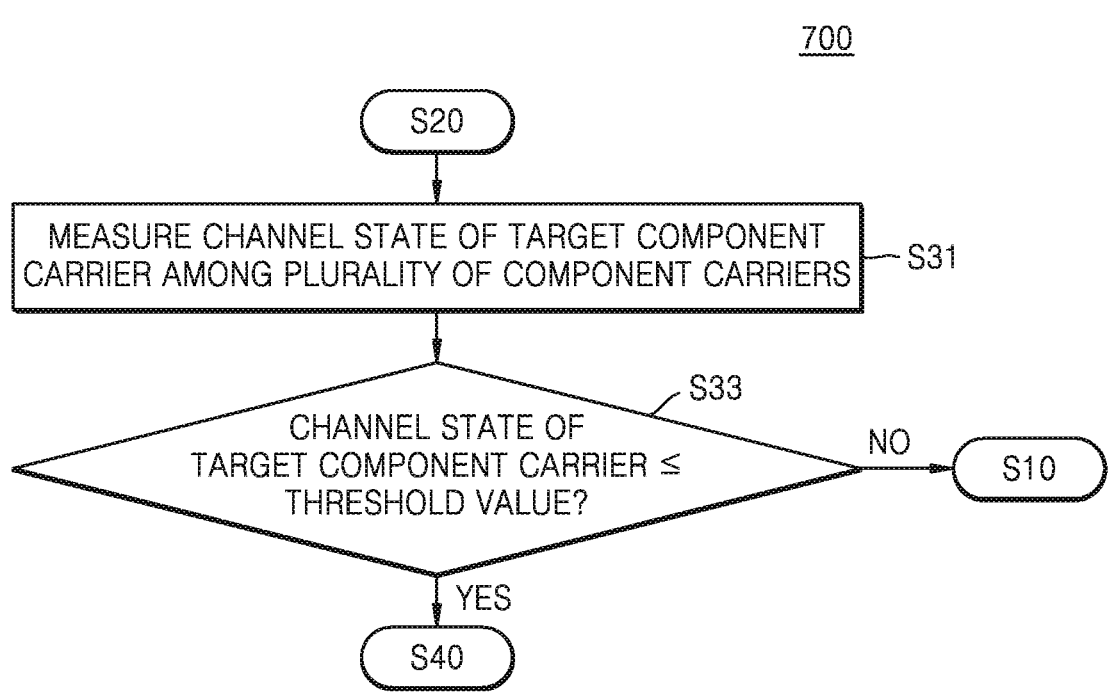
FIG. 7 is a flowchart of an operation of identifying a channel state of a user equipment, according to an embodiment.

FIG. 7 is a flowchart 700 of an operation of identifying a channel state of a user equipment, according to an embodiment.

In detail, FIG. 7 is a diagram for explaining an operation of transmitting, to a base station, a signal for requesting to change layer allocation information, based on a channel state of a target component carrier, performed by the processor 560 of the user equipment of FIG. 5.

Referring to FIG. 7, as the channel state of the target component carrier deteriorates, the operation of transmitting a signal for requesting to change layer allocation information, to the base station, may include operations S31 and S33, each of which may be a sub-operation of operation S30 of FIG. 6.

In operation S31, the processor may measure a channel state of the target component carrier among the plurality of component carriers. Here, the target component carrier may refer to a component carrier to which a largest number of layers are allocated, among the plurality of component carriers. Since wireless communication between the base station and the user equipment is performed mainly based on the target component carrier, deterioration in the channel state of the target component carrier may cause degradation of the wireless communication performance.

In operation S33, the processor may identify whether the channel state of the target component carrier is equal to or less than a threshold value. The channel state of the target component carrier may be indicated by an RI or a CQI.

For example, when the channel state of the target component carrier exceeds the threshold value, the processor may perform operation S10.

For example, when the channel state of the target component carrier is equal to or less than the threshold value, the processor may identify the channel state of the target component carrier as having deteriorated, and may perform operation S40.

For example, when at least one of an RI and a CQI of the target component carrier is less than or equal to the threshold value, the processor may identify that channel deterioration has occurred in the target component carrier. When channel deterioration occurs in the target component carrier, as the data throughput of received data in the user equipment decreases, the wireless communication performance of the user equipment may also be degraded.

FIG. 8 is a diagram 800 illustrating antenna switching of a user equipment according to deterioration in a channel state, according to an embodiment.

In detail, FIG. 8 is a diagram for describing an operation of transmitting, to a base station, a request to change layer allocation information of a plurality of component carriers, performed by the processor 560 of the user equipment of FIG. 5, when channel deterioration occurs in a target component carrier.

Referring to FIG. 8, the horizontal axis represents time, and the vertical axis represents a rank indicator (RI) (with values represented by shaded areas). The example of FIG. 8 assumes that the base station and the user equipment perform wireless communication based on the first component carrier CC0 and the second component carrier CC1. The example further assumes that, based on the first layer allocation information (initial layer allocation information) of the base station, four layers are allocated to the first component carrier CC0, and two layers are allocated to the second component carrier CC1. As explained below, based on the second layer allocation information (changed layer allocation information) at time point (b) 850, two layers become allocated to the first component carrier CC0 and four layers become allocated to the second component carrier CC1.

The first component carrier CC0 in the example is a target component carrier to which a largest number of layers are allocated among all of the plurality of component carriers (e.g., CC0, CC1).

As illustrated in FIG. 8, as an RI of the first component carrier CC0 is measured to gradually decrease from '4' to '1', the user equipment may identify that the channel state of the first component carrier CC0, which is the target component carrier, has deteriorated.

On the other hand, as an RI of the second component carrier CC1 is measured to be maintained at '2', the user equipment may identify that the channel state of the second component carrier CC1 has become superior to that of the first component carrier CC0 at a time when the RI of CC0 has dropped to '1'.

When the channel state of the first component carrier CC0, which is the target component carrier, has deteriorated, e.g., below a threshold, the user equipment may transmit, to the base station, a request to change layer allocation information of the plurality of component carriers at a time point (a) 810 to prevent degradation of the wireless communication performance.

For example, referring to TS 38.331, a signal for requesting to change layer allocation information, transmitted from the user equipment to the base station, is as shown in Table 5 below. However, unlike embodiments of the present disclosure, a signal for making such a request according to TS 38.311 may be based on a channel measurement of just the target carrier component, without considering the channel quality of any other carrier component. This may result in the problem delineated above in which the changed layer allocation information results in worse communication performance.

In accordance with embodiments of the present inventive concept, the user equipment may send a layer change request to the base station when the measured channel state of the target component carrier has deteriorated, e.g., below the channel state measured for another component carrier as illustrated in FIG. 8. The layer change request is effectively a request to change the target component carrier in some examples, in which case the base station transmits changed layer allocation information to the user equipment, corresponding to the changed target component carrier. In various embodiments, the changed layer allocation information is based on a comparison of the channel state (e.g., indicated by the RI) of the target component carrier and the channel state of at least one other carrier component. In another example, the changed layer allocation information is based on a comparison of total data throughput, such that a change in the target component carrier is made only if it is determined that total data throughput through CC0 and CC1 would improve. In the example of FIG. 8, the UE may receive the changed layer allocation information at a time point (b) 850, and may change, based on the changed layer allocation information, allocation of the number of antennas for the plurality of component carriers.

As illustrated in FIG. 8, as the RI of the changed target component carrier CC1 increases from '3' to '4' after the time point (b) 850, the user equipment may improve the wireless communication performance by changing the number of antennas for the plurality of component carriers based on the changed layer allocation information. It should be noted that in the example, the RI measured for the component carrier CC1 occurring prior to time point (b) 850 may be a maximum of '2' because only two reception antennas were used during that time. After time point (b) 850, four reception antennas are used for CC1 and thus a maximum RI of '4' can be measured.

Therefore, when the channel state of the target component carrier has deteriorated, the user equipment according to the embodiment may transmit, to the base station, a request to change layer allocation information of the plurality of component carriers to adaptively change the number of antennas

TABLE 5

| MaxMIMO-LayerPreference-r16 ::= | SEQUENCE { |
|---|---|
| reducedMaxMIMO-LayersFR1-r16 | SEQUENCE { |
| reducedMIMO-LayersFR1-DL-r16 | INTEGER (1..8), |
| reducedMIMO-LayersFR1-UL-r16 | INTEGER (1..4) |
| } OPTIONAL, | |
| reducedMaxMIMO-LayersFR2-r16 | SEQUENCE { |
| reducedMIMO-LayersFR2-DL-r16 | INTEGER (1..8), |
| reducedMIMO-LayersFR2-UL-r16 | INTEGER (1..4) |
| } OPTIONAL | |
| maxMIMO-ChangeRequest | INTEGER (1..8) |
| } | | maxMIMO-ChangeRequest
Indicates the preferred amount of minimum number of MaxMIMO-Layers for current CC.

Here, 'maxMIMO-ChangeRequest' of Table 5 may include information about the maximum number of layers that are at least required by the user equipment to perform wireless communication at a particular performance level.

For example, when the user equipment requires at least four layers for the wireless communication at the particular performance level, the user equipment may transmit, to the base station, 'maxMIMO-ChangeRequest' indicating that the maximum number of layers allocated to a plurality of component carriers should be '4' or more.

for each of the plurality of component carriers of the user equipment, thereby preventing degradation of the data reception performance due to channel deterioration.

Figure 9:
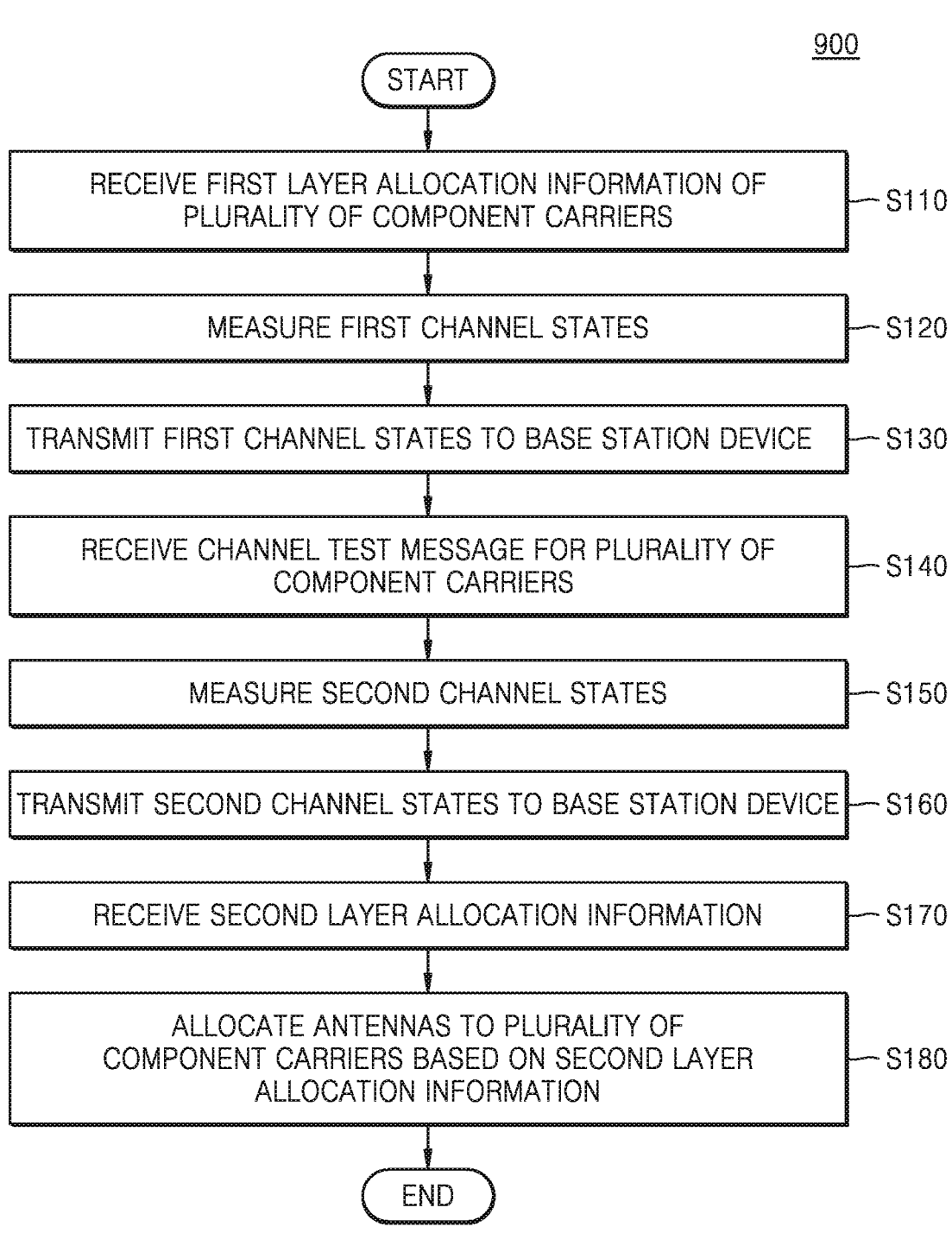
FIG. 9 is a flowchart of an operating method of a user equipment, according to another embodiment.

FIG. 9 is a flowchart 900 of an operating method of a user equipment, according to another embodiment.

In detail, FIG. 9 is a diagram for describing an operation of requesting to change layer allocation information by measuring channel states of a plurality of component carriers in advance, based on the changed layer allocation information, performed by the processor 560 of the user equipment of FIG. 5.

Referring to FIG. 9, the operation of requesting to change layer allocation information by measuring the channel states of the plurality of component carriers in advance may include operations S110, S120, S130, S140, S150, S160, S170, and S180.

In operation S110, the processor may receive first layer allocation information of the plurality of component carriers.

The processor may transmit capability information of the user equipment to the base station as an initial connection operation for performing wireless communication. The capability information of the user equipment may include information about a combination of the maximum number of reception antennas allocated to each of the plurality of component carriers, that is, the maximum possible number of reception antennas for the plurality of component carriers.

The first layer allocation information of the plurality of component carriers is information set based on the capability information of the user equipment, and may include the number of layers allocated to each of the plurality of component carriers (e.g., the maximum number of layers), and may be received from the base station.

In operation S120, the processor may measure respective first channel states of the plurality of component carriers (e.g., a first channel state of CC #0 and a first channel state of CC #1 in the example setup of FIG. 3A).

For example, the processor may allocate a first combination of the numbers of first reception antennas for each of the plurality of component carriers based on layer allocation information of the plurality of component carriers.

For example, the processor may measure respective first channel states of the plurality of component carriers based on the configured combination of the number of first reception antennas. Here, the measured channel states of the plurality of component carriers may be indicated by an RI or a CQI of each of the plurality of component carriers.

In operation S130, the processor may transmit the first channel states to the base station.

For example, the base station may receive, from the user equipment, information about the first channel states of the plurality of component carriers based on the combination of the numbers of first reception antennas. The base station may generate a channel test message for changing the layer allocation information, based on the received information about the first channel states.

For example, when a first channel state of a component carrier to which the largest number of layers are allocated among the plurality of component carriers (hereinafter, referred to as a 'first target component carrier') is identified as having deteriorated, e.g., to less than a first threshold value, and a first channel state of a component carrier to which fewer layers than that allocated to the first target component carrier are allocated (hereinafter referred to as a 'second target component carrier') is identified as being greater than or equal to a second threshold value (the same as or different from the first threshold value), the base station may determine that layer allocation information of the plurality of component carriers is to be changed. The first target component carrier and the second target component carrier may be determined based on the first layer allocation information.

When determining to change the layer allocation information, to effectively change the layer allocation information, the base station may request in advance channel state information of the plurality of component carriers (e.g., information about respective second channel states of the component carriers) based on the combination of the numbers of second reception antennas in the channel test message).

For example, the base station may transmit, to the user equipment, a channel test message including a request for channel state information of the plurality of component carriers, based on the combination of the numbers of second reception antennas (or a second combination of numbers of the first reception antennas).

In operation S140, the processor may receive the channel test message for the plurality of component carriers.

Here, the channel test message is a message for measuring a channel in advance before changing the layer allocation information, and may be determined based on the information about the first channel state. In addition, the channel test message may include, for a channel test, channel measurement information and layer allocation information which indicates the maximum number of layers allocated to the plurality of component carriers. The channel measurement information is information used for antenna switching when the user equipment changes the first layer allocation information to the second layer allocation information later, and may include offset information related to a measurement time of the channel states of the plurality of component carriers.

In operation S150, the processor may measure the second channel states.

For example, the processor may allocate a combination of the numbers of second reception antennas to the plurality of component carriers based on the received channel test message. The combination of the numbers of second reception antennas (or the second combination of the numbers of the first reception antennas) may refer to a combination of the numbers of reception antennas allocated to the plurality of component carriers according to the layer allocation information included in the channel test message.

In operation S160, the processor may transmit the second channel states to the base station. For example, the processor may transmit information about the second channel states measured with respect to the plurality of component carriers, to the base station, based on the combination of the numbers of second reception antennas. The information about the second channel states is channel state information measured based on the combination of the numbers of second reception antennas (or the second combination of the numbers of the first reception antennas), and may be indicated by an RI, a CQI or a data throughput of each component of each of the plurality of component carriers.

For example, based on the RI, CQI, and the data throughput of a target component carrier, when the second channel state of the target component carrier is identified as being deteriorated, the processor may transmit, to the base station, a request to change the layer allocation information along with a report on the second channel state. This will be described in detail below with reference to FIG. 10.

In operation S170, the processor may receive second layer allocation information.

For example, the processor may receive, from the base station, the second layer allocation information determined based on the second channel state.

For example, when the total data throughput of the first target component carrier and the second target component carrier in the second channel state is greater than the total data throughput of the first target component carrier and the second target component carrier in the first channel state, the second layer allocation information may include information corresponding to information about the number of layers allocated to the plurality of component carriers, included in the channel test message (e.g., the maximum number of allocated layers). The total data throughput may refer to a value obtained by adding the data throughput of the first target component carrier and the data throughput of the second target component carrier in each channel state. The first target component carrier and the second target component carrier may refer to target component carriers determined based on the first layer allocation information.

For example, when the total data throughput of the first target component carrier and the second target component carrier in the second channel state is less than the total data throughput of the first target component carrier and the second target component carrier in the first channel state, the second layer allocation information may include information not corresponding to the information about the number of layers allocated to the plurality of component carriers included in the channel test message (e.g., the maximum number of allocated layers). The second layer allocation information here may include layer allocation information of the plurality of component carriers, which is reset based on the report on the second channel state. In other words, in this case the second layer allocation information may be the same as the first layer allocation information.

In operation S180, the processor may allocate antennas to the plurality of component carriers based on the second layer allocation information.

For example, the processor may set the maximum number of reception antennas for each of the plurality of component carriers, based on the received second layer allocation information.

Thus, when a channel state of an existing first target component carrier has deteriorated, and the channel state of the second target component carrier, to which fewer layers are allocated than to the first target component carrier, is good, the user equipment according to the embodiment may measure the channel state (e.g., the second channel state) in advance based on the layer allocation information to be changed (e.g., the second layer allocation information), and then change the layer allocation information based on the measured channel state to thereby efficiently change the layer allocation information.

Figure 10:
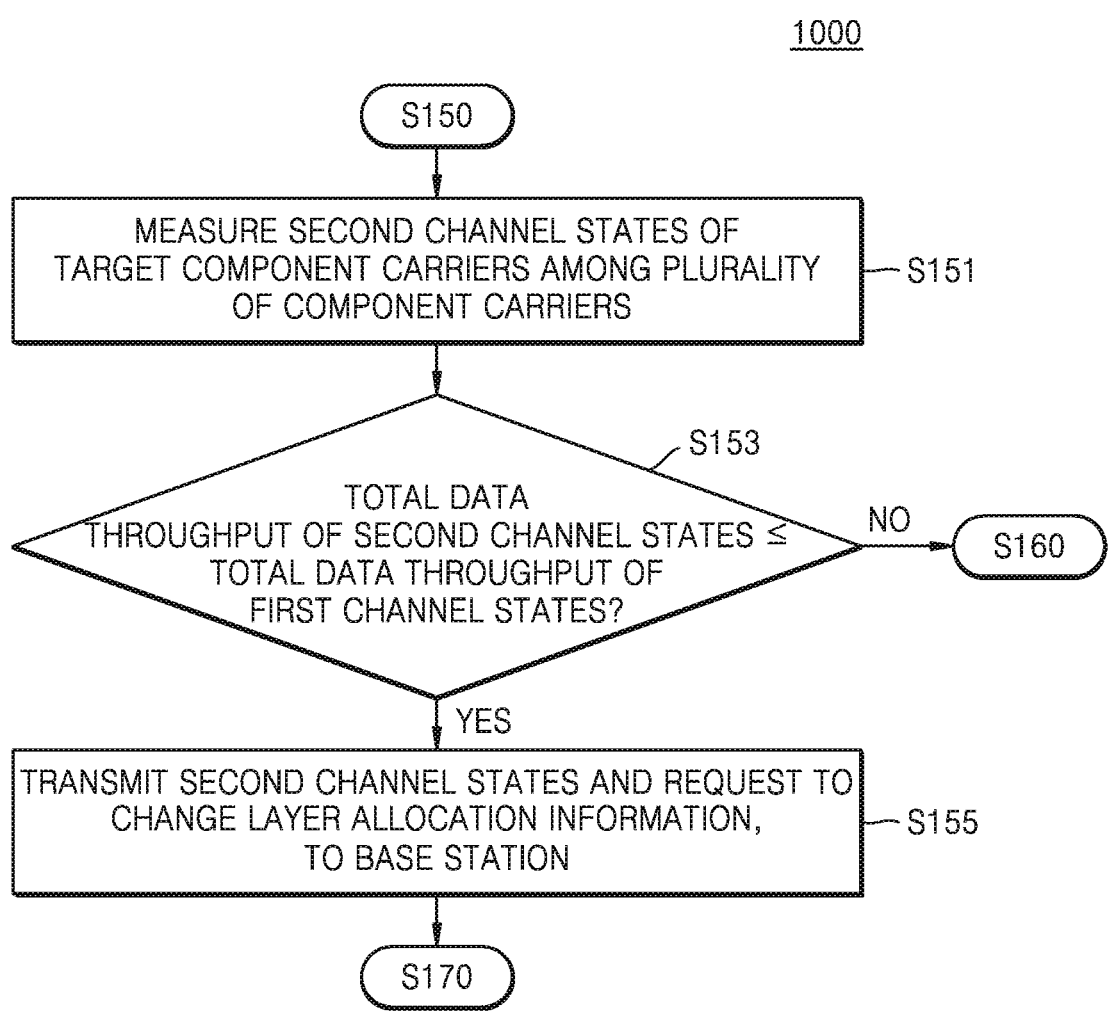
FIG. 10 is a flowchart of an operation of identifying a channel state of a user equipment, according to another embodiment.

FIG. 10 is a flowchart 1000 of an operation of identifying a channel state of a user equipment, according to another embodiment.

In detail, FIG. 10 is a diagram for describing an operation of pre-identifying a channel state of a target component carrier to be changed as layer allocation information is changed, performed by the processor 560 of the user equipment of FIG. 5.

Hereinafter, a component carrier to which a largest number of layers are allocated among a plurality of component carriers according to the first layer allocation information will be referred to as a first target component carrier. In addition, a component carrier having fewer layers allocated thereto than the first target component carrier according to the first layer allocation information and having a channel state equal to or greater than a threshold is referred to as a second target component carrier.

Referring to FIG. 10, when the channel state of the target component carrier to be changed in advance has deteriorated, the operation of transmitting, to the base station, a signal for requesting to change the layer allocation information together with the report on the second channel state may include operations S151, S153, and S155.

In operation S151, the processor may measure a second channel state of target component carriers among the plurality of component carriers. Since wireless communication between the base station and the user equipment is performed mainly based on the first target component carrier, to which a largest number of layers are allocated, deterioration in the channel state of the first target component carrier may cause degradation of the wireless communication performance.

In operation S153, the processor may identify whether the total data throughput of the second channel state is less than the total data throughput of the first channel state. The total data throughput of each channel state may indicate a sum of the data throughputs of the first target component carrier and that of the second target component carrier in each channel state.

For example, when the total data throughput of the second channel state is greater than the total data throughput of the first channel state, the processor may identify that the second channel state according to the layer allocation information included in the channel test message is good, and perform operation S160.

For example, when the total data throughput of the second channel state is less than the total data throughput of the first channel state, the processor may identify that the second channel state according to the layer allocation information included in the channel test message has deteriorated, and perform operation S170.

In operation S155, the processor may transmit the second channel state and a request to change the layer allocation information, to the base station.

For example, when the total data throughput of the second channel state is less than the total data throughput of the first channel state, the processor may transmit the second channel state and the request to change the layer allocation information, to the base station. The request to change the layer allocation information may be transmitted to the base station based on the 'maxMIMO-ChangeRequest' of FIG. 8 described above.

The user equipment according to an embodiment may identify a channel state of a target component carrier to be changed in advance, based on the layer information included in the channel test message, and perform layer allocation, thereby preventing inefficient/non-optimum layer allocation and efficiently changing layer allocation information of the plurality of component carriers.

Figure 11:
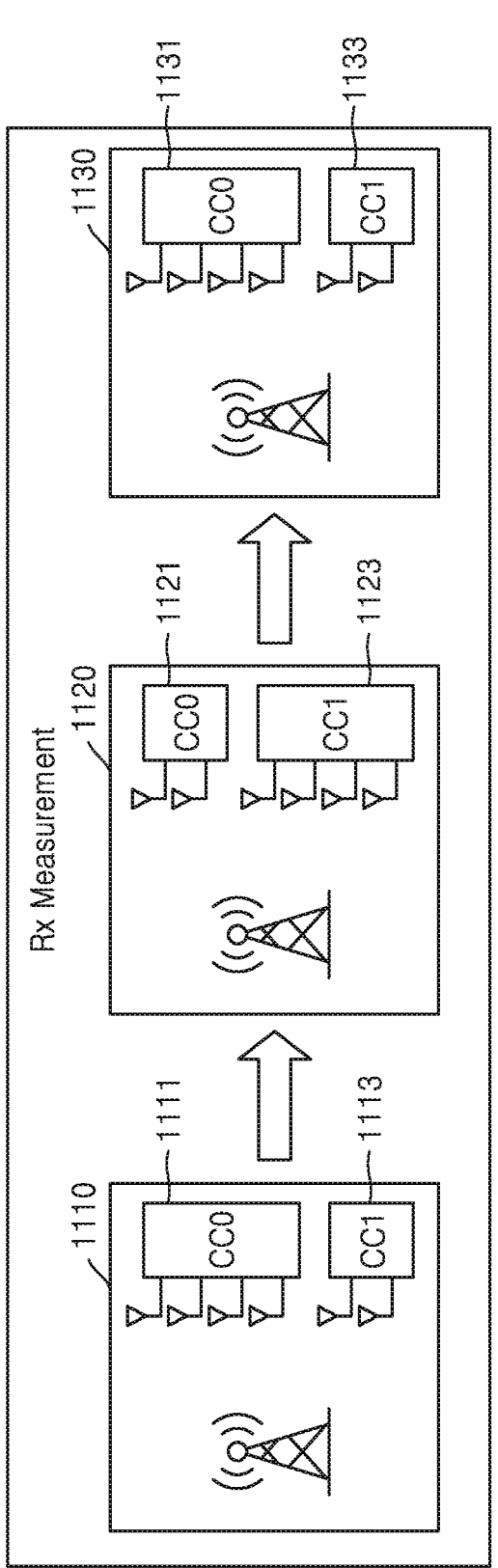
FIG. 11 is a diagram illustrating measurement of a channel state based on a channel test message in a user equipment, according to another embodiment.

FIG. 11 is a diagram 1100 illustrating measurement of a channel state based on a channel test message by a user equipment, according to another embodiment.

In detail, FIG. 11 is a diagram for describing an antenna switching operation for pre-identifying a channel state of a target component carrier to be changed, performed by the processor 560 of the user equipment of FIG. 5, when channel deterioration occurs in an existing target component carrier.

Referring to FIG. 11, it is assumed in the first layer allocation information (initial layer allocation information) that four layers are allocated to the first component carrier CC0 and two layers are allocated to the second component carrier CC1. It is assumed in the layer allocation information which is to be changed and included in the channel test message, that two layers are allocated to the first component carrier CC0 and four layers are allocated to the second component carrier CC1.

A first setup 1110 shows a setup in which a combination of the numbers of first reception antennas is allocated to a plurality of component carriers according to the first layer allocation information. For example, based on the first layer allocation information received from the base station, the user equipment may allocate the combination of the numbers of first reception antennas by setting four reception antennas to a first component carrier CC0 1111 and setting two reception antennas to a second component carrier CC1 1113.

Here, when the channel state of the first component carrier CC0 1111, which is the first target component carrier, is plurality of component carriers (e.g., the maximum number of layers allocated to each of the plurality of component carriers) and channel measurement information.

For example, referring to TS 38.331, the channel test message transmitted from the base station to the user equipment is as shown in Table 6 below.

TABLE 6

```
- MeasGapConfig
The IE MeasGapConfig specifies the measurement gap configuration and controls
setup/release of measurement gaps.
MeasGapConfig information element
-- ASN1START
-- TAG-MEASGAPCONFIG-START
PLMN-IdentityInfo ::=                        SEQUENCE {
   ranac-r16                                 RAN-AreaCode            OPTIONAL,
-- Need R
   ...,
   [[
   ranac-r16                                 RAN-AreaCode            OPTIONAL,
-- Need R
   ranac                                     RAN-AreaCode            OPTIONAL,
-- Need R
   ]],                                                  SetupRelease { GapConfig }
   gapRxMeasure -- Need M
}
GapConfig ::=                                SEQUENCE {
   gapOffset                                 INTEGER (0..159),
   mgl                                       ENUMERATED {ms1dot5, ms3, ms3dot5, ms4, ms5dot5,
ms6},
   mgrp                                      ENUMERATED {ms20, ms40, ms80, ms160},
   mgta                                      ENUMERATED {ms0, ms0dot25, ms0dot5},
   ...,
   maxMIMO-ChangeIndex                               INTEGER (0..8),
   [[
   refServCellIndicator                      ENUMERATED {pCell, pSCell, mcg-FR2}
OPTIONAL -- Cond NEDCorNRDC
   ]],
   [[
   refFR2ServCellAsyncCA-r16                         ServCellIndex
OPTIONAL, -- Cond AsyncCA
   ranac-r16                                 RAN-AreaCode            OPTIONAL,
-- Need R
   ]]
}
gapUE
Indicates measurement gap configuration that applies to all frequencies (FR1 and FR2). In
(NG)EN-DC, gapUE cannot be set up by NR RRC (i.e. only LTE RRC can configure per
UE measurement gap). In NE-DC, gapUE can only be set up by NR RRC (i.e. LTE RRC
cannot configure per UE gap). In NR-DC, gapUE can only be set up in the measConfig
associated with MCG. If gapUE is configured, then neither gapFRI nor gapFR2 can be
configured. The applicability of the per UE measurement gap is according to Table 9.1.2-2
and Table 9.1.2-3 in TS 38.133 [14].
gapRxMeausre
Indicates Rx measurement gap configuration that applies to all frequencies (FR1 and FR2).
...
maxMIMO-ChangeIndex
Indicates the maximum number of MIMO layers to be used during Rx measurement gap.
``` identified as having deteriorated, and the channel state of the second component carrier CC1 1113, which is the second target component carrier, is identified as being relatively good, the base station may transmit the channel test message to the user equipment. The second target component carrier is a component carrier to which a smaller number of layers is allocated than the first target component carrier, and may represent a component carrier identified as having a relatively good channel state compared to the channel state of the first target component carrier.

The channel test message is a message for measuring a channel to be changed in advance before changing the layer allocation information, and may include information about the changed number of layers allocated to each of the Here, 'gapRxMeausre' in Table 6 is information about a reception measurement gap applicable to all frequencies, and may include 'gapOffset' information and 'maxMIMO-ChangeIndex' information. 'gapOffset' information indicates offset information related to a measurement time of a channel state of a plurality of component carriers based on the changed layer allocation information, and 'maxMIMO-ChangeIndex' information indicates a maximum number of MIMO layers used during a reception measurement gap.

A second setup 1120 shows a setup in which a combination of the numbers of second reception antennas is allocated to the plurality of component carriers according to a channel test message. For example, the user equipment may set two reception antennas to a first component carrier CC0 1121 and set four reception antennas to a second component carrier CC1 1123, based on the channel test message received from the base station.

For example, the user equipment may measure a channel state of the plurality of component carriers including the first component carrier CC0 1121 and the second component carrier CC1 1123, which is based on the combination of the numbers of second reception antennas (e.g., the total data throughput of the first component carrier CC0 1121 and the second component carrier CC1 1123 in the second setup).

For example, the user equipment may identify whether the total data throughput in the second setup 1120 is less than the total data throughput in the first setup 1110. The total data throughput for each setup may indicate a sum of the data throughputs of the first target component carrier and that of the second target component carrier in each setup. For example, the total data throughput in the first setup 1110 may refer to a sum of the data throughput of the first component carrier CC0 1111 and that of the second component carrier CC1 1113 in the first setup 1110.

For example, when the total data throughput of the second setup 1120 is less than the total data throughput of the first setup 1110, the processor may identify that the channel state of the second setup 1120 according to the layer allocation information included in the channel test message is deteriorated compared to the channel state of the first setup 1110, and the user equipment may transmit, to the base station, a request to change the layer allocation information included in the channel test message, together with a channel state report of the second setup 1120.

For example, when the total data throughput of the second setup 1120 is less than the total data throughput of the first setup 1110, the processor may identify that the channel state of the second setup 1120 according to the layer allocation information included in the channel test message is deteriorated compared to the channel state of the first setup 1110, and the user equipment may transmit, to the base station, only the channel state report of the second setup 1120.

A third setup 1130 shows a setup in which a combination of the numbers of first reception antennas is reallocated to the plurality of component carriers according to the first layer allocation information received from the base station. For example, the user equipment may perform wireless communication with the base station based on the existing layer allocation information (e.g., the first layer allocation information) until the changed layer allocation information (e.g., the second layer allocation information) is received. According to the first layer allocation information, the user equipment may set four reception antennas to a first component carrier CC0 1131 and set two reception antennas to a second component carrier CC1 1133. For instance, until the user equipment receives the changed second layer allocation information, according to the previously allocated first layer allocation information, a combination of the numbers of first reception antennas may be reallocated to the plurality of component carriers.

For example, when the total data throughput of the first component carrier CC0 1121 and the second component carrier CC1 1123 in the second setup 1120 is greater than the total data throughput of the first component carrier CC0 1111 and the second component carrier CC1 1113 in the first setup 1110, the channel state in the second setup 1120 may be identified as being relatively good compared to the first setup 1110. The second layer allocation information may include information corresponding to information about the number of layers allocated to the plurality of component carriers (e.g., the maximum number of allocated layers) in the second setup 1120 included in the channel test message.

For example, when the total data throughput of the first component carrier CC0 1121 and the second component carrier CC1 1123 in the second setup 1120 is less than the total data throughput of the first component carrier CC0 1111 and the second component carrier CC1 1113 in the first setup 1110, the channel state in the second setup 1120 may be identified as being relatively deteriorated compared to the first setup 1110. Here, the second layer allocation information may include information not corresponding to information about the number of layers allocated to the plurality of component carriers (e.g., the maximum number of allocated layers) in the second setup 1120 included in the channel test message.

The user equipment according to an embodiment may test in advance a channel state of a target component carrier to be changed, based on the layer allocation information to be changed, and perform layer allocation based on the previously tested channel state, thereby preventing waste of resources due to inefficient/non-optimum layer allocation and efficiently allocating layers to the component carriers.

Figure 12:
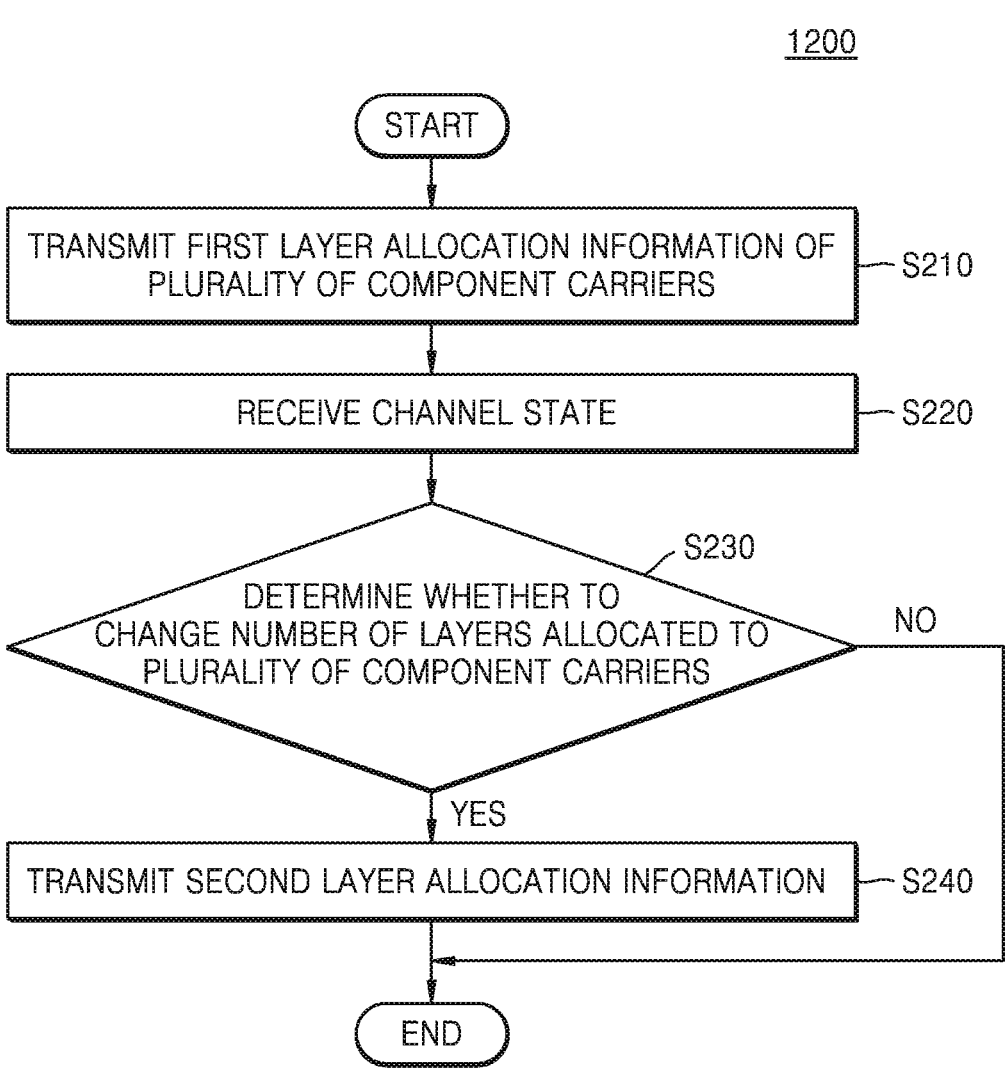
FIG. 12 is a flowchart of an operating method of a base station, according to an embodiment.

FIG. 12 is a flowchart 1200 of an operating method of a base station, according to an embodiment.

In detail, FIG. 12 is a diagram for describing an operation of transmitting, to a user equipment, layer allocation information changed based on a channel state of a plurality of component carriers, performed by the processor 460 of the base station.

Referring to FIG. 12, the operation of transmitting, to the user equipment, the layer allocation information changed based on the channel state based on the channel state may include operations S210, S220, S230, and S240.

In operation S210, the processor may transmit first layer allocation information of a plurality of component carriers. The first layer allocation information is information set based on capability information of the user equipment, received at the time of initial connection, and may include information about the number of layers allocated to each of the plurality of component carriers (e.g., the maximum number of layers).

For example, the processor may receive the capability information of the user equipment from the user equipment for wireless communication connection with the user equipment. The received capability information of the user equipment may include information about a combination of the maximum possible numbers of reception antennas allocated to the plurality of component carriers.

In operation S220, the processor may receive a channel state.

For example, the processor may receive, from the user equipment, information about the channel state of the plurality of component carriers. Here, the channel state of the plurality of component carriers may be indicated by an RI or a CQI of each of the plurality of component carriers.

For example, the processor may measure a channel state of a target component carrier among the plurality of component carriers. This will be described in detail below with reference to FIG. 13.

In operation S230, the processor may determine whether to change the number of layers allocated to the plurality of component carriers.

For example, the processor may determine whether to change layer allocation information based on the channel state of the target component carrier among the plurality of component carriers.

For example, when the processor determines not to change the number of layers allocated to the plurality of component carriers, the processor may end the operation and wait until next layer allocation.

For example, when the processor determines to change the number of layers allocated to the plurality of component carriers, the processor may perform operation S240.

For example, when the processor has identified that the channel state of the target component carrier among the plurality of component carriers has deteriorated, the processor may determine to change the number of layers allocated to the plurality of component carriers.

In operation S240, the processor may transmit second layer allocation information. The second layer allocation information is information set based on the channel state of the plurality of component carriers, and may include information about the number of layers changed for each of the plurality of component carriers (e.g., the maximum number of layers).

For example, the processor may select a component carrier having a best channel state among the plurality of component carriers based on the channel state of the plurality of component carriers as a changed target component carrier. The processor may transmit the generated second layer allocation information to the user equipment by allocating the largest number of layers to the changed target component carrier.

Figure 13:
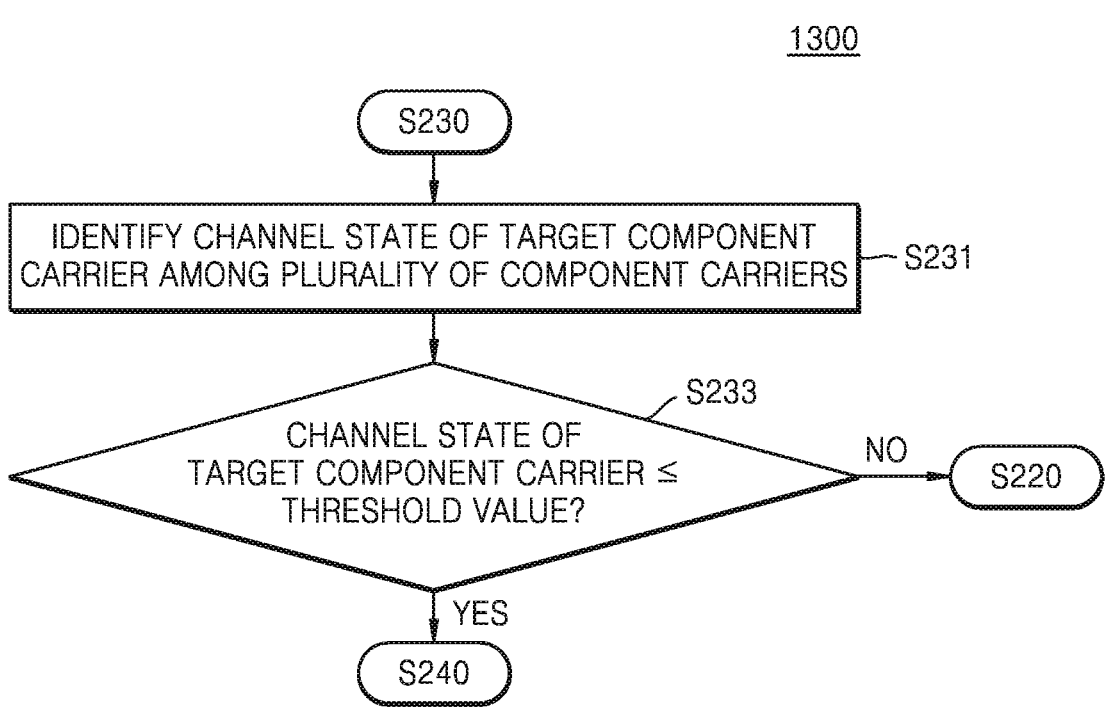
FIG. 13 is a flowchart of an operation of identifying a channel state of a base station, according to an embodiment.

FIG. 13 is a flowchart 1300 of an operation of identifying a channel state of a base station, according to an embodiment.

In detail, FIG. 13 is a diagram for describing an operation of identifying a channel state of a target component carrier, performed by the processor 460 of the base station.

Referring to FIG. 13, the operation of identifying the channel state of the target component carrier of the base station may include operations S231 and S233.

In operation S231, the processor may measure the channel state of the target component carrier among the plurality of component carriers. Here, the target component carrier may refer to a component carrier to which the largest number of layers is allocated, among the plurality of component carriers. Since wireless communication between the base station and the user equipment is performed mainly based on the target component carrier, deterioration in the channel state of the target component carrier may cause degradation of the wireless communication performance.

In operation S233, the processor may identify whether the channel state of the target component carrier is equal to or less than a threshold value. The channel state of the target component carrier may be indicated by an RI or a CQI.

For example, when the channel state of the target component carrier exceeds the threshold value, the processor may perform operation S220.

For example, when the channel state of the target component carrier is equal to or less than the threshold value, the processor may identify the channel state of the target component carrier as having deteriorated, and may perform operation S240.

For example, when at least one of the RI and the CQI of the target component carrier is less than or equal to the threshold value, the processor may identify that channel deterioration has occurred in the target component carrier. When channel deterioration occurs in the target component carrier, as the data throughput of received data in the user equipment decreases, the wireless communication performance of the user equipment may also be degraded.

FIG. 14 is a diagram 1400 illustrating antenna switching by a base station, according to deterioration in a channel state, according to an embodiment.

In detail, FIG. 14 is a diagram for describing an example operation of transmitting second layer allocation information by changing layer allocation information of a plurality of component carriers, performed by the processor 460 of the base station of FIG. 4, when channel deterioration occurs in a target component carrier. The example of FIG. 14 illustrates the same results for RI measurements vs. time as that of FIG. 8 discussed above mainly in the context of the UE's operations.

Referring to FIG. 14, the horizontal axis represents time domain, and the vertical axis represents an RI area. As illustrated in FIG. 14, it is assumed that the base station and the user equipment perform wireless communication based on the first component carrier CC0 and the second component carrier CC1. It is assumed that, based on the first layer allocation information (initial layer allocation information), four layers are allocated to the first component carrier CC0, and two layers are allocated to the second component carrier CC1. It is assumed that, based on the second layer allocation information (changed layer allocation information), two layers are allocated to the first component carrier CC0 and four layers are allocated to the second component carrier CC1.

The first component carrier CC0 is an existing target component carrier to which the largest number of layers is allocated among the plurality of component carriers (e.g., CC0, CC1), based on the first layer allocation information.

As illustrated in FIG. 14, as the RI of the first component carrier CC0 is measured (at the UE or the base station) to gradually decrease from '4' to '1', the base station may identify that the channel state of the first component carrier CC0, which is the existing target component carrier, has deteriorated (if the RI is measured at the UE, the base station identifies the deterioration based on a message from the UE).

On the other hand, as the RI of the second component carrier CC1 is measured to be maintained at '2', the user equipment may identify that the channel state of the second component carrier CC1 is relatively good compared to the first component carrier CC0.

When the channel state of the first component carrier CC0, which is the target component carrier, has deteriorated, the base station may transmit, to the user equipment, a signal including the second layer allocation information, at a time point (c) 1410 to prevent degradation of the wireless communication performance. The second layer allocation information may include layer allocation information changed based on the channel state of the plurality of component carriers.

For example, referring to TS 38.331, a signal including the second layer allocation information transmitted from the base station to the user equipment is as shown in Table 7 below.

TABLE 7

7.3.1.2.1     Format 1_0
DCI format 1_0 is used for the scheduling of PDSCH in one DL cell.
The following information is transmitted by means of the DCI format 1_0 with CRC
scrambled by C-RNTI or CS-RNTI or MCS-C-RNTI:
-    Identifier for DCI formats - 1 bits
-    The value of this bit field is always set to 1, indicating a DL DCI format
-    Frequency domain resource allocation - $\lceil log_2(N_{RB}^{DL,BWP}(N_{RB}^{DL,BWP}+1)/2)\rceil$ bits where
$N_{RB}^{DL,BWP}$ is given by clause 7.3.1.0
If the CRC of the DCI format 1_0 is scrambled by C-RNTI and the "Frequency domain
resource allocation" field are of all ones, the DCI format 1_0 is for random access
procedure initiated by a PDCCH order, with all remaining fields set as follows:
-    Random Access Preamble index - 6 bits according to ra-PreambleIndex in Clause
5.1.2 of [8, TS38.321]
-    UL/SUL indicator - 1 bit. If the value of the "Random Access Preamble index" is
not all zeros and if the UE is configured with supplementaryUplink in ServingCellConfig in
the cell, this field indicates which UL carrier in the cell to transmit the PRACH according
to Table 7.3.1.1.1-1; otherwise, this field is reserved
-    SS/PBCH index - 6 bits. If the value of the "Random Access Preamble index" is
not all zeros, this field indicates the SS/PBCH that shall be used to determine the RACH
occasion for the PRACH transmission; otherwise, this field is reserved.
-    PRACH Mask index - 4 bits. If the value of the "Random Access Preamble index"
is not all zeros, this field indicates the RACH occasion associated with the SS/PBCH
indicated by "SS/PBCH index" for the PRACH transmission, according to Clause 5.1.1 of
[8, TS38.321]; otherwise, this field is reserved
-    maxMIMO Change indicator - 1 bits. If the value of the "maxMIMO Change
indicator" is not zero, this field indicates the gNB will transmit reference signals with
"maxMIMO-Layers" equals to "maxMIMM Change index".
-    maxMIMO Change index - 3 bits. Value maxMIMO Change index indicates the
maximum number of MIMO layers to be used during maxMIMO Change gap.
-    maxMIMO Change offset - 4 bits. Value maxMIMO Change offset indicates is the
offset required for maxMIMO Change to be applied.
- Reserved bits - 4 bits for operation in a cell with shared spectrum channel access;
otherwise 2 bits Here, 'maxMIMO Change indicator' of Table 7 may be expressed as 1 bit, and indicate whether MIMO layer allocation information is changed. 'maxMIMO Change index' may be expressed as 3 bits, and indicate the maximum number of MIMO layers used during a MIMO layer change gap. 'maxMIMO Change offset' may be expressed as 4 bits, and indicate an offset about a point in time of applying the changed maximum number of MIMO layers.

For example, the user equipment may receive, from the base station, at a time point (c) 1410, second layer allocation information. The user equipment may change the number of antennas for each of the plurality of component carriers based on the second layer allocation information. The user equipment may set, based on the second layer allocation information, two reception antennas to the first component carrier CC0 and set four reception antennas to the second component carrier CC1.

For example, the user equipment may apply the changed antenna setting based on the second layer allocation information at a time point (e) 1450, which is after an offset corresponding to a period (d) 1320, based on the information 'maxMIMO Change offset' of the second layer allocation information.

As illustrated in FIG. 14, as the RI of the changed target component carrier CC1 increases from '3' to '4' after the time point (e) 1450, the user equipment may improve the wireless communication performance by changing the circuit based on the changed layer allocation information.

Accordingly, when the channel state of the existing target component carrier has deteriorated, the base station according to an embodiment may change the layer allocation information based on the channel state of the plurality of component carriers and transmit the layer allocation information to the user equipment, thereby preventing degradation in the data transmission and reception performance of the wireless communication system due to channel deterioration. As noted above for the example of FIG. 8, in various embodiments of the inventive concept, the changed layer allocation information differs from that obtained through conventional systems compliant with TS 38.331 by being based on a comparison of the channel state (e.g., indicated by the RI) of the target component carrier and the channel state of at least one other carrier component. In another example, the changed layer allocation information is based on a comparison of total data throughput, such that a change in the target component carrier is made only if it is determined that total data throughput through CC0 and CC1 would improve. On the other hand, conventional systems may change layer allocation information based just on the channel measurements at the target carrier component, leading to inefficiencies and wasted resources as noted earlier.

Figure 15:
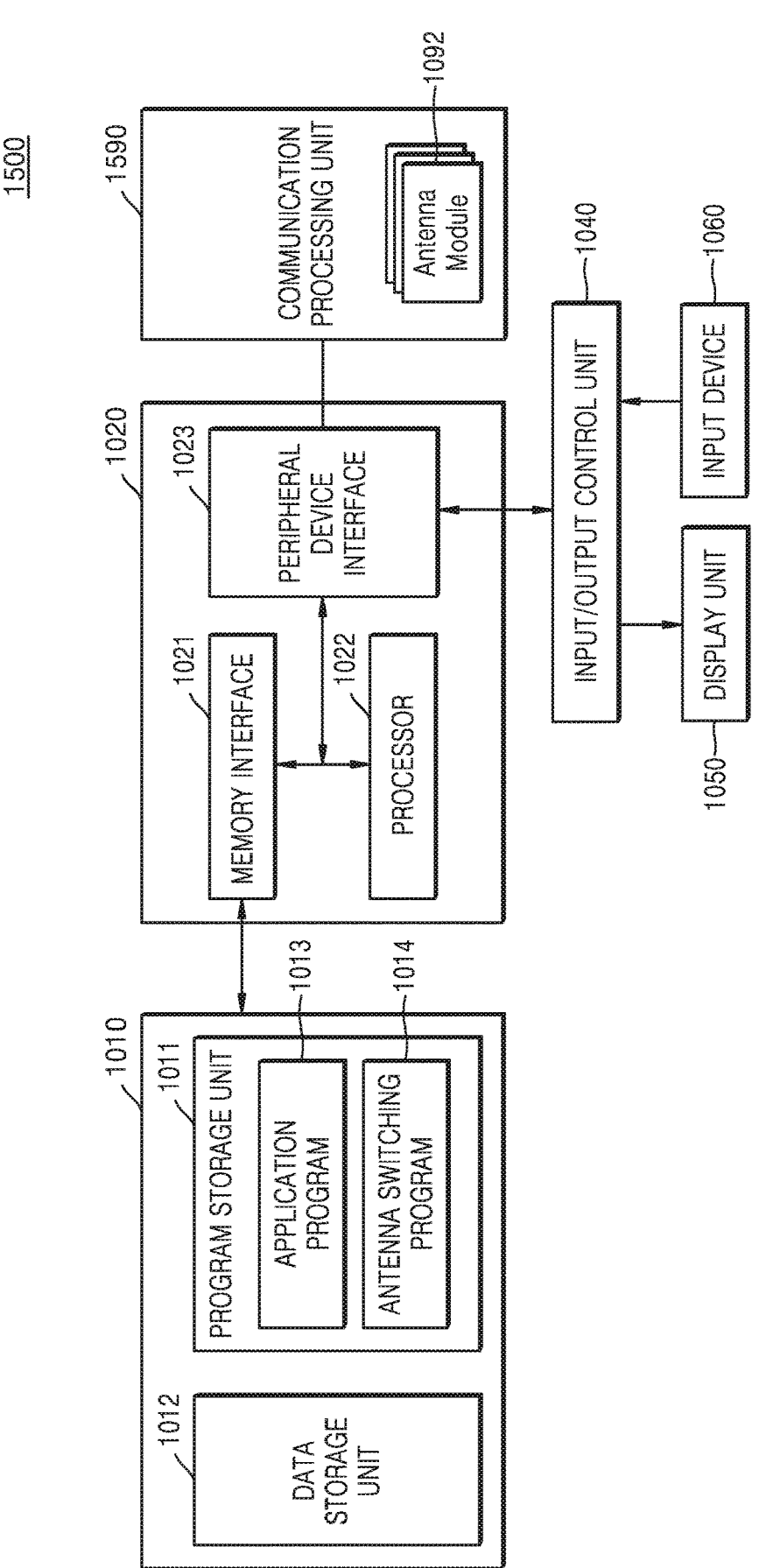
FIG. 15 is a block diagram illustrating an electronic apparatus according to an embodiment.

FIG. 15 is a block diagram illustrating an electronic apparatus 1500 according to an embodiment. The wireless communication apparatus 1500 of FIG. 15 may correspond to the user equipment 10 of FIG. 1.

Referring to FIG. 15, the electronic apparatus 1500 may include a memory 1010, a processor unit 1020, an input/output control unit 1040, a display unit 1050, an input device 1060, and a communication processing unit 1090. The memory 1010 may be provided in plurality. Each component will be described in detail below.

The memory 1010 may include a program storage unit 1011 that stores a program for controlling the operation of the electronic apparatus 1500, and a data storage unit 1012 that stores data generated during execution of a program. The data storage unit 1012 may store data necessary for the operation of an application program 1013 and an antenna module setting program 1014. The program storage unit 1011 may include the application program 1013 and the antenna module setting program 1014. Here, the program included in the program storage unit 1011 may be a set of instructions, and may be expressed as an instruction set.

The application program 1013 includes an application program operating in the electronic apparatus 1500. That is, the application program 1013 may include instructions of an application driven by a processor 1022. The antenna module setting program 1014 may generate indicators indicating reception quality, based on a channel state of a plurality of component carriers of a plurality of antenna modules 1092 in an initial stage, according to embodiments. In addition, the antenna module setting program 1014 may configure a reception antenna for a plurality of component carriers based on layer allocation information received from a base station, according to embodiments.

A peripheral device interface 1023 may control connection between an input/output peripheral device of the base station, the processor 1022, and a memory interface 1021. The processor 1022 controls the base station to provide a corresponding service by using at least one software program. Here, the processor 1022 may execute at least one program stored in the memory 1010 to provide a service corresponding to the program.

The input/output control unit 1040 may provide an interface between an input/output device such as the display unit 1050 and the input device 1060 and the peripheral device interface 1023. The display unit 1050 displays status information, input characters, moving pictures, and still pictures. For example, the display unit 1050 may display application program information driven by the processor 1022.

The input device 1060 may provide input data generated by selection of the electronic apparatus 1500 to the processor unit 1020 through the input/output controller 1040. The input device 1060 may include a keypad including at least one hardware button and a touch pad for sensing touch information. For example, the input device 1060 may provide touch information, such as a touch, a touch movement, and a touch release, sensed through a touch pad, to the processor 1022 through the input/output controller 1040. The electronic apparatus 1500 may include a communication processing unit 1090 that performs communication functions for voice communication and data communication. The communication processing unit 1090 may include a plurality of antenna modules 1092 for supporting communication in the millimeter wave band, according to embodiments.

Figure 16:
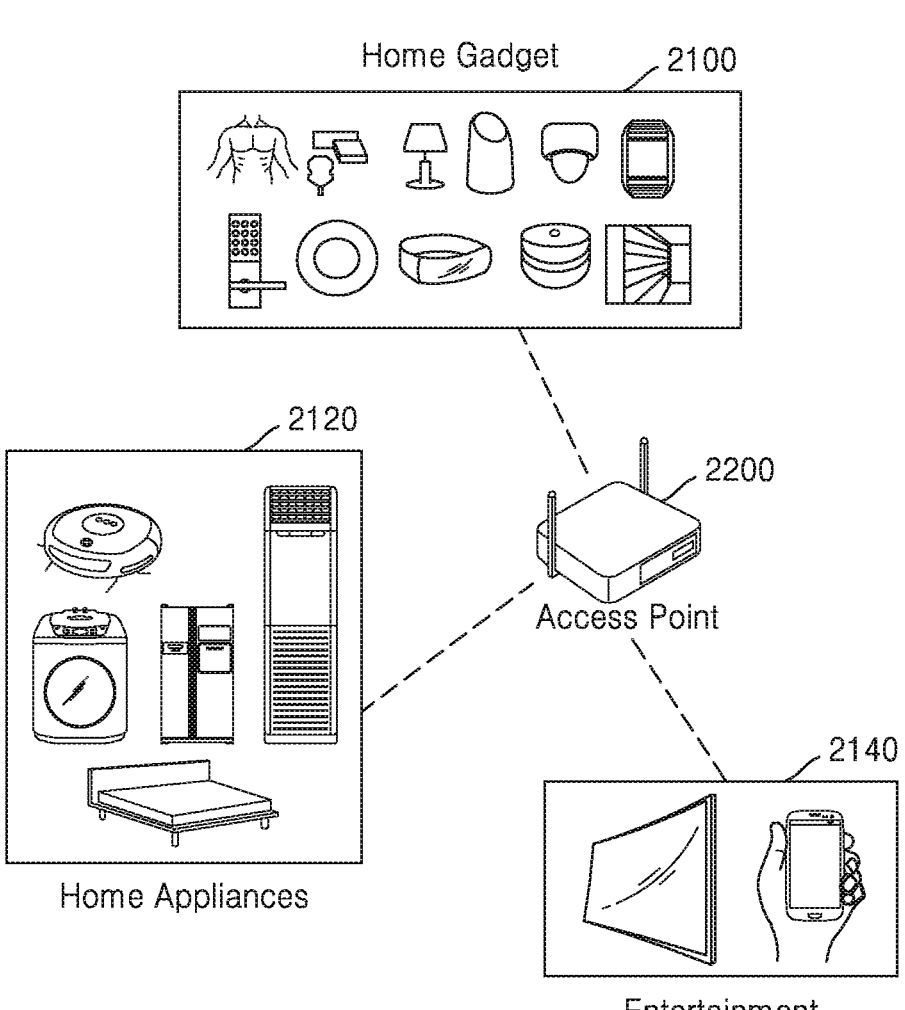
FIG. 16 is a diagram illustrating communication apparatuses including a plurality of modules, according to an embodiment.

FIG. 16 is a diagram 1600 illustrating communication apparatuses 1600 including a plurality of modules, according to an embodiment.

Referring to FIG. 16, a home gadget 2100, a home appliance 2120, an entertainment device 2140, and an AP 2200 may each perform antenna module selection and antenna module switching operations according to embodiments. In some embodiments, the home gadget 2100, the home appliance 2120, the entertainment device 2140, and the AP 2200 may constitute an Internet of Things (IoT) network system. It will be understood that the communication apparatuses 1600 illustrated in FIG. 16 are only examples, and the embodiments may be applied to other communication apparatuses not shown in FIG. 16.

While the inventive concept has been particularly shown and described with reference to embodiments thereof, it will be understood that various changes in form and details may be made therein without departing from the spirit and scope of the following claims.

What is claimed is:

1. A user equipment comprising:
   a plurality of antennas including at least first and second groups of antennas, each of the first and second groups respectively allocated to one of a plurality of component carriers according to layer allocation information of the plurality of component carriers;
   a radio frequency integrated circuit (RFIC) configured to transmit or receive a signal at frequencies of the plurality of component carriers through the plurality of antennas; and
   a processor configured to measure respective channel states of the plurality of component carriers, identify a channel state of a target component carrier among the plurality of component carriers, generate a request to change the layer allocation information of the plurality of component carriers when the channel state of the target component carrier is less than a threshold value, and control the RFIC to transmit the request to change to a base station,
   wherein the target component carrier is a component carrier to which a largest number of layers are allocated, from among the plurality of component carriers, based on the layer allocation information.

2. The user equipment of claim 1, wherein the processor is further configured to transmit capability information of the user equipment to the base station,
   wherein the capability information comprises information about a combination of numbers of antennas capable of reception on the plurality of component carriers by the user equipment.

3. The user equipment of claim 1, wherein the channel state is indicated by a rank indicator (RI) or a channel quality indicator (CQI) of each of the plurality of component carriers, based on the layer allocation information.

4. The user equipment of claim 3, wherein the processor is further configured to:
   control the RFIC to receive, from the base station, layer change information about the plurality of component carriers, as a response to the request, and
   change a number of antennas allocated to each of the plurality of component carriers, based on the layer change information.

5. The user equipment of claim 4, wherein the layer change information is generated based on at least one of the RI and the CQI of each of the plurality of component carriers.

6. A base station comprising:
   a plurality of antennas including at least first and second groups of antennas, each of the first and second groups respectively allocated to one of a plurality of component carriers according to layer allocation information of the plurality of component carriers;
   a radio frequency integrated circuit (RFIC) configured to transmit or receive a signal through the plurality of component carriers by using the plurality of antennas; and
   a processor configured to receive information about respective channel states of the plurality of component carriers from a user equipment, identify, based on the information about the channel states, a channel state of a target component carrier from among the plurality of component carriers, determine whether to change a number of layers allocated to one or more of the plurality of component carriers, when the channel state of the target component carrier is less than a threshold value, based on the information about the channel states, and control the RFIC to transmit changed layer allocation information of the plurality of component carriers, to the user equipment, when the number of allocated layers is changed, wherein the target component carrier is a component carrier to which a largest number of layers are allocated, from among the plurality of component carriers.

7. The base station of claim 6, wherein the layer allocation information comprises information indicating a maximum number of layers allocated to each of the plurality of component carriers.

8. The base station of claim 6, wherein the changed layer allocation information comprises information indicating whether the layer allocation information of the plurality of component carriers is changed, information indicating the changed number of layers for each of the plurality of component carriers, and offset information related to a point in time of applying the changed layer allocation information.

9. The base station of claim 6, wherein the processor is further configured to receive capability information of the user equipment from the user equipment, wherein the capability information comprises information about a combination of numbers of antennas capable of reception on the plurality of component carriers by the user equipment.

10. The base station of claim 6, wherein the information about the channel states is indicated by a rank indicator (RI) or a channel quality indicator (CQI) of each of the plurality of component carriers, based on the layer allocation information.

11. The base station of claim 6, wherein the processor is further configured to identify, based on the information about the channel states, a component carrier having a best channel state from among the plurality of component carriers, and change the number of allocated layers by allocating a largest number of layers to the component carrier having the best channel state.

12. An operating method of a wireless communication system including a user equipment and a base station, the operating method comprising:

receiving, by the user equipment, a channel test message for a plurality of component carriers from the base station;

allocating, by the user equipment, a respective number of antennas to each of the plurality of component carriers according to a first layer combination of the plurality of component carriers of the channel test message;

measuring, by the user equipment, based on the channel test message, respective channel states of the plurality of component carriers;

transmitting, by the user equipment, a report on the channel test to the base station; and restoring, by the user equipment, the plurality of component carriers to a previous number of allocated antennas according to previous layer allocation information of the plurality of component carriers, based on the report on the channel test.

13. The operating method of claim 12, wherein the channel test message comprises:

information about the first layer combination indicating a maximum number of layers allocated to each of the plurality of component carriers; and channel measurement information, wherein the channel measurement information comprises offset information related to difference in a measurement time of the channel state of different ones of the plurality of component carriers.

14. The operating method of claim 12, further comprising:

generating, by the base station, the channel test message, based on a previous channel state of the plurality of component carriers; and transmitting, by the base station to the user equipment, the generated channel test message.

15. The operating method of claim 12, further comprising:

receiving, by the base station, a report on the channel test;

generating, by the base station, a second layer combination allocated to the plurality of component carriers, based on the report on the channel test; and transmitting, by the base station to the user equipment, changed layer allocation information including the second layer combination.

16. The operating method of claim 15, further comprising:

receiving, by the user equipment, the changed layer allocation information from the base station; and changing, by the user equipment, a number of antennas allocated to each of the plurality of component carriers according to the second layer combination of the changed layer allocation information.

17. The operating method of claim 12, further comprising:

identifying, by the user equipment, a total data throughput of target component carriers based on the first layer combination; and when the total data throughput of the target component carriers based on the first layer combination is less than a total data throughput of the target component carriers based on the previous layer allocation information, transmitting, by the user equipment to the base station, a request to change the first layer combination included in the channel test message, wherein the target component carriers comprise: a first target component carrier, to which a largest number of layers are allocated among the plurality of component carriers, based on the first layer combination; and a second target component carrier, and the second target component carrier comprises a component carrier to which fewer layers are allocated than to the first target component carrier, and which has a superior channel state than the first target component carrier.

18. The operating method of claim 17, wherein the report on the channel state is indicated based on at least one of: a rank indicator (RI) of each of the plurality of component carriers; a channel quality indicator (CQI) of each of the plurality of component carriers, to which a number of antennas are allocated based on the channel test message; or a total data throughput of the target component carriers.

* * * * *